United States Patent
Kageyama et al.

(10) Patent No.: US 9,902,623 B2
(45) Date of Patent: Feb. 27, 2018

(54) MACROPOROUS TITANIUM COMPOUND MONOLITH AND METHOD FOR PRODUCING SAME

(71) Applicant: Japan Science and Technology Agency, Saitama (JP)

(72) Inventors: Hiroshi Kageyama, Kyoto (JP); Kazuki Nakanishi, Kyoto (JP); Yoji Kobayashi, Kyoto (JP); Atsushi Kitada, Kyoto (JP); George Hasegawa, Kyoto (JP)

(73) Assignee: JAPAN SCIENCE AND TECHNOLOGY AGENCY, Saitama (JP)

( * ) Notice: Subject to any disclaimer, the term of this patent is extended or adjusted under 35 U.S.C. 154(b) by 428 days.

(21) Appl. No.: 14/379,218

(22) PCT Filed: Feb. 18, 2013

(86) PCT No.: PCT/JP2013/000886
§ 371 (c)(1),
(2) Date: Aug. 15, 2014

(87) PCT Pub. No.: WO2013/121801
PCT Pub. Date: Aug. 22, 2013

(65) Prior Publication Data
US 2015/0037236 A1 Feb. 5, 2015

(30) Foreign Application Priority Data

Feb. 17, 2012 (JP) .................................. 2012-032411

(51) Int. Cl.
*C01G 23/04* (2006.01)
*B82Y 30/00* (2011.01)
(Continued)

(52) U.S. Cl.
CPC ............ *C01G 23/043* (2013.01); *B82Y 30/00* (2013.01); *C01B 21/076* (2013.01);
(Continued)

(58) Field of Classification Search
None
See application file for complete search history.

(56) References Cited

U.S. PATENT DOCUMENTS 3,771,997 A * 11/1973 Clark ........................ C22B 9/18
148/26
5,976,454 A 11/1999 Sterzel
(Continued)

FOREIGN PATENT DOCUMENTS

DE 10121928 A1 11/2002
EP 0799810 A2 10/1997
(Continued)

OTHER PUBLICATIONS

Hirao et al.; Phase-Separation-Induced Titania Monoliths with Well-Defined Macropores and Mesostructured Framework from Colloid-Derived Sol-Gel Systems; Chem. Mater.; 18, 864-866; 2006.*
(Continued)

*Primary Examiner* — Guinever S Gregorio
(74) *Attorney, Agent, or Firm* — Michael Best & Friedrich LLP

(57) ABSTRACT

Provided are a macroporous titanium compound monolith and a production method thereof, the macroporous titanium compound monolith having a framework that is composed of a titanium compound other than titanium dioxide, having controlled macropores, and having electron conductivity, the titanium compound being oxygen-deficient titanium oxide, titanium oxynitride, or titanium nitride. Provided is a method including: placing a macroporous titanium dioxide
(Continued)

monolith and a metal having titanium-reducing ability in a container, the macroporous titanium dioxide monolith having a co-continuous structure of a macropore and a framework that is composed of titanium dioxide; creating a vacuum atmosphere or an inert gas atmosphere within the container; and heating the monolith and the metal to cause gas-phase reduction that removes oxygen atom from the titanium dioxide composing the monolith by the metal acting as an oxygen getter, thereby obtaining a macroporous oxygen-deficient titanium oxide monolith having a co-continuous structure of the macropore and a framework that is composed of oxygen-deficient titanium oxide, the macroporous oxygen-deficient titanium oxide monolith having electron conductivity derived from the oxygen-deficient titanium oxide.

19 Claims, 15 Drawing Sheets

(51) Int. Cl.
| | |
|---|---|
| C01B 21/076 | (2006.01) |
| C04B 35/58 | (2006.01) |
| C01B 21/082 | (2006.01) |
| C04B 35/46 | (2006.01) |
| C04B 41/00 | (2006.01) |
| C04B 41/80 | (2006.01) |
| C04B 38/00 | (2006.01) |
| C25B 11/04 | (2006.01) |
| H01M 4/48 | (2010.01) |
| C04B 111/00 | (2006.01) |

(52) U.S. Cl.
CPC ...... *C01B 21/0761* (2013.01); *C01B 21/0821* (2013.01); *C04B 35/46* (2013.01); *C04B 35/58014* (2013.01); *C04B 38/0032* (2013.01); *C04B 41/009* (2013.01); *C04B 41/0072* (2013.01); *C04B 41/80* (2013.01); *C25B 11/04* (2013.01); *C01P 2002/72* (2013.01); *C01P 2004/03* (2013.01); *C01P 2004/61* (2013.01); *C01P 2004/62* (2013.01); *C01P 2004/64* (2013.01); *C01P 2006/40* (2013.01); *C04B 2111/0081* (2013.01); *C04B 2111/00818* (2013.01); *C04B 2235/3232* (2013.01); *C04B 2235/3886* (2013.01); *C04B 2235/404* (2013.01); *C04B 2235/422* (2013.01); *C04B 2235/48* (2013.01); *C04B 2235/616* (2013.01); *C04B 2235/6587* (2013.01); *C04B 2235/664* (2013.01); *C04B 2235/79* (2013.01); *C04B 2235/81* (2013.01); *H01M 4/48* (2013.01)

(56) References Cited

U.S. PATENT DOCUMENTS

| | | |
|---|---|---|
| 6,911,192 B2 | 6/2005 | Nakanishi |
| 2010/0324155 A1 | 12/2010 | Burrell |

FOREIGN PATENT DOCUMENTS

| | | |
|---|---|---|
| JP | S61-127607 A | 6/1986 |
| JP | H06-505469 A | 6/1994 |
| JP | 2000-103608 A | 4/2000 |
| JP | 2000-239709 A | 9/2000 |
| JP | 2002-154823 A | 5/2002 |
| JP | 2011-518094 A | 6/2011 |
| WO | WO-92/14683 A1 | 9/1992 |
| WO | WO-03/002458 A1 | 1/2003 |
| WO | WO-2007/021037 A1 | 2/2007 |
| WO | WO-2009/086006 A2 | 7/2009 |

OTHER PUBLICATIONS

Lin et al.; New Insights into the Origin of Visible Light Photocatalytic Activity of Nitrogen-Doped and Oxygen-Deficient Anatase TiO2; J. Phys. Chem. B; 109, 20948-20952; 2005.*
Yu et al.; Hydrogen Production by Photocatalytic Water Splitting over Pt/TiO2 Nanosheets with Exposed (001) Facets; J. Phys. Chem.; 114, 13118-13125; 2010.*
Hayfield; Development of a New Material—Monolithic Ti4O7 Ebonex Ceramic; Feb. 16, 2001.*
Chapter 2 Hayfield; Development of a New Material—Monolithic Ti4O7 Ebonex Ceramic; Feb. 16, 2001.*
K. Kolbrecka et al., "Sub-Stoichiometric Titanium Oxides as Ceramic Electrodes for Oxygen Evolution-Structural Aspects of the Voltammetric Behaviour of $Ti_nO_{2n-1}$," Electrochimica Acta, 1994, pp. 1591-1595 (5 pages), vol. 39, No. 11/12, Elsevier Science Ltd. Great Britain.
S.-Y. Park et al., "Characteristics of Pt thin films on the conducting ceramics TiO and Ebonex ($Ti_4O_7$) as electrode materials," Thin Solid Films, 1995, pp. 5-9 (5 pages), vol. 258, Elsevier Science S.A.
Chikka Titanium ni yori Naru Denkyoku ni Okeru Ensan no Denkai ni Saisuru Inkyoku Process no Kenkyu (Wabun Hyoudai), 1976, vol. 19, No. 2, pp. 275-277, Chemistry and Chemical Technology.
George Hasegawa et al., "Facile Preparation of Hierarchically Porous $TiO_2$ Monoliths," Journal of American Ceramic Society, Oct. 2010, vol. 93, No. 10, pp. 3110-3115 (6 pages), The American Ceramic Society.
International Search Report issued in Application PCT/JP2013/000886, dated May 21, 2013.
Smith J R et al., "Electrodes Based on Magneli Phase Titanium Oxides: The Properties and Applications of Ebonex Materials," Journal of Applied Electrochemistry, Springer, Dordrecht, NL, vol. 28, No. 10, pp. 1021-1033, XP000786928, ISSN: 0021-891X, DOI: 10.1023/A:1003469427858, Oct. 1, 1998.
Yan-Jie Wang et al., "Noncarbon Support Materials for Polymer Electrolyte Membrane Fuel Cell Electrocatalysts," Chemical Reviews, vol. 111, No. 12, pp. 7625-7651, XP55111689, ISSN: 0009-2665, DOI: 10.1021/cr100060r, Dec. 14, 2011.
Palanichamy Krishnan et al., "Magneli phase Ti n 02n-1 as corrosion-resistant PEM fuel cell catalyst support," Journal of Solid State Electrochemistry, pp. 2515-2521, XP55201401, ISSN: 1432-8488, DOI: 10.1007/s10008-012-1663-1, Feb. 16, 2012.
Atsushi Kitada et al., Selective Preparation of Macroporous Monoliths of Conductive Titanium Oxides Ti n 0 2 n-1 (n = 2, 3, 4, 6), Journal of the American Chemical Society, vol. 134, No. 26, pp. 10894-10898, XP55199553, ISSN: 0002-7863, DOI: 10.1021/ja302083n, Jul. 4, 2012.
Extended search report issued in European Application No. 13748592.6, dated Oct. 7, 2015.
International Preliminary Report on Patentability issued in Application No. PCT/JP2013/000886, dated May 15, 2014.

* cited by examiner

MACROPOROUS TITANIUM COMPOUND MONOLITH AND METHOD FOR PRODUCING SAME

TECHNICAL FIELD

The present invention relates to a titanium compound monolith having macroporosity and to a method for producing the titanium compound monolith. More specifically, the present invention relates to a macroporous titanium compound monolith having a co-continuous structure of a macropore and a framework that is composed of oxygen-deficient titanium oxide, titanium oxynitride, or titanium nitride, and relates to a method for producing the macroporous titanium compound monolith.

BACKGROUND ART

There are known porous monoliths having pores and composed of an inorganic material such as silica. Such monoliths are widely used in chromatography separation columns, enzyme carriers, catalyst carriers, etc. For production of such porous monoliths, a sol-gel method, which is a liquid-phase reaction method, is generally used. The sol-gel method refers to a method in which: an inorganic low-molecular compound having a hydrolyzable functional group and dispersed in a dispersion medium is used as a starting material; and an aggregate or a polymer of an oxide is obtained by a sol-gel reaction, that is, by hydrolysis of the compound followed by polycondensation. The inorganic low-molecular compound as the starting material is, for example, a metal alkoxide, a metal chloride, or a metal salt having a hydrolyzable functional group.

Conventional common porous monoliths usually have only mesopores (pores having a diameter of 2 nm or more and less than 50 nm). Such porous monoliths do not necessarily posses characteristics required for various applications. Patent Literature 1 (WO 03/002458 A1) discloses a method of producing a porous monolith having mesopores with a narrow pore size distribution and further having controlled macropores (pores having a diameter of 50 nm or more) by adjusting the conditions of a sol-gel reaction so that the sol-gel transition and the phase separation simultaneously take place.

Patent Literature 2 (WO 2007/021037 A1) discloses a method for producing a porous monolith that has a framework composed of titanium dioxide ($TiO_2$) and has controlled mesopores and macropores. The method disclosed in Patent Literature 2 can yield, based on the method disclosed in Patent Literature 1, a porous monolith of titanium dioxide which is a titanium compound in the case of which the pores are difficult to control by conventional sol-gel methods due to very high hydrolyzability of the inorganic low-molecular compound used (e.g., an alkoxide).

However, there are very few disclosures relating to a method for producing a porous monolith composed of a titanium compound other than titanium dioxide. Non Patent Literature 1 disclosing such a method specifically discloses a method including: mixing a titanium dioxide powder and an organic solvent containing a polymer material acting as a template for macropores; molding and sintering the resulting mixture; and subjecting the resulting porous monolith to a reducing treatment using hydrogen to introduce oxygen deficiency in the monolith. This porous monolith has electron conductivity derived from the oxygen-deficient titanium oxide. Judging from the production method, however, it is considered that the porous monolith produced by this method is basically a powder aggregate, has only macropores formed by burning off of the polymer material dispersed in the mixture, and does not have controlled macropores. Furthermore, although in this porous monolith the particles of the oxygen-deficient titanium oxide powder are bound together, a single crystalline phase of the oxygen-deficient titanium oxide is not thought to be achieved.

CITATION LIST

Patent Literature

Patent Literature 1: WO 03/002458 A1
Patent Literature 2: WO 2007/021037 A1

Non Patent Literature

Non Patent Literature 1: K. Kolbrecka, J. Przyluski, "Sub-stoichiometric titanium oxides as ceramic electrodes for oxygen evolution-structural aspects of the voltammetric behaviour of $Ti_nO_{2n-1}$", Electrochimica Acta, vol. 39 [11-12], pp. 1591-1595 (1994)

SUMMARY OF INVENTION

Technical Problem

The present invention aims to provide a macroporous titanium compound monolith and a production method thereof, the macroporous titanium compound monolith being composed of a titanium compound other than titanium dioxide, having controlled macropores, and having electron conductivity, the titanium compound being oxygen-deficient titanium oxide, titanium oxynitride, or titanium nitride.

Solution to Problem

A macroporous titanium compound monolith of the present invention has a co-continuous structure of a macropore and a framework that is composed of single-phase oxygen-deficient titanium oxide, and the macroporous titanium compound monolith has electron conductivity derived from the oxygen-deficient titanium oxide.

A method of the present invention for producing a macroporous titanium compound monolith includes: placing a macroporous titanium dioxide monolith and a metal having titanium-reducing ability in a container, the macroporous titanium dioxide monolith having a co-continuous structure of a macropore and a framework that is composed of titanium dioxide; creating a vacuum atmosphere or an inert gas atmosphere within the container; and heating the monolith and the metal to cause gas-phase reduction that removes oxygen atom from the titanium dioxide composing the monolith by the metal acting as an oxygen getter, thereby obtaining a macroporous oxygen-deficient titanium oxide monolith having a co-continuous structure of the macropore and a framework that is composed of oxygen-deficient titanium oxide, the macroporous oxygen-deficient titanium oxide monolith having electron conductivity derived from the oxygen-deficient titanium oxide.

From another aspect, the macroporous titanium compound monolith of the present invention has a co-continuous structure of a macropore and a framework that is composed of titanium oxynitride, and the macroporous titanium compound monolith has electron conductivity derived from the titanium oxynitride.

From another aspect, the method of the present invention for producing a macroporous titanium compound monolith includes: placing a macroporous titanium compound monolith and a metal nitride in a container, the macroporous titanium compound monolith having a co-continuous structure of a macropore and a framework that is composed of titanium dioxide or oxygen-deficient titanium oxide; creating a vacuum atmosphere or an inert gas atmosphere within the container; and heating the monolith and the metal nitride to cause gas-phase reduction that removes oxygen atom from, and donates nitrogen atom to, the titanium compound composing the monolith by the metal nitride acting as an oxygen getter and as a nitrogen donor, thereby obtaining a macroporous titanium oxynitride monolith having a co-continuous structure of the macropore and a framework that is composed of titanium oxynitride, the macroporous titanium oxynitride monolith having electron conductivity derived from the titanium oxynitride.

From another aspect, the macroporous titanium compound monolith of the present invention has a co-continuous structure of a macropore and a framework that is composed of titanium nitride, and the macroporous titanium compound monolith has electron conductivity derived from the titanium nitride.

From another aspect, the method of the present invention for producing a macroporous titanium compound monolith includes: subjecting a macroporous titanium compound monolith having a co-continuous structure of a macropore and a framework that is composed of titanium dioxide, oxygen-deficient titanium oxide, or titanium oxynitride to a heat treatment in an ammonia-containing atmosphere at a temperature equal to or higher than a thermal decomposition temperature of ammonia, so as to cause gas-phase reduction that removes oxygen atom from, and donates nitrogen atom to, the titanium compound composing the monolith, thereby obtaining a macroporous titanium nitride monolith having a co-continuous structure of the macropore and a framework that is composed of titanium nitride, the macroporous titanium nitride monolith having electron conductivity derived from the titanium nitride.

Advantageous Effects of Invention

According to the present invention, there are provided a macroporous titanium compound monolith and a production method thereof, the macroporous titanium compound monolith being composed of a titanium compound other than titanium dioxide, having controlled macropores, and having electron conductivity, the titanium compound being oxygen-deficient titanium oxide, titanium oxynitride, or titanium nitride. In addition, according to the present invention, a macroporous titanium compound monolith having a framework composed of single-phase oxygen-deficient titanium oxide is obtained.

DESCRIPTION OF EMBODIMENTS

Figure 1:
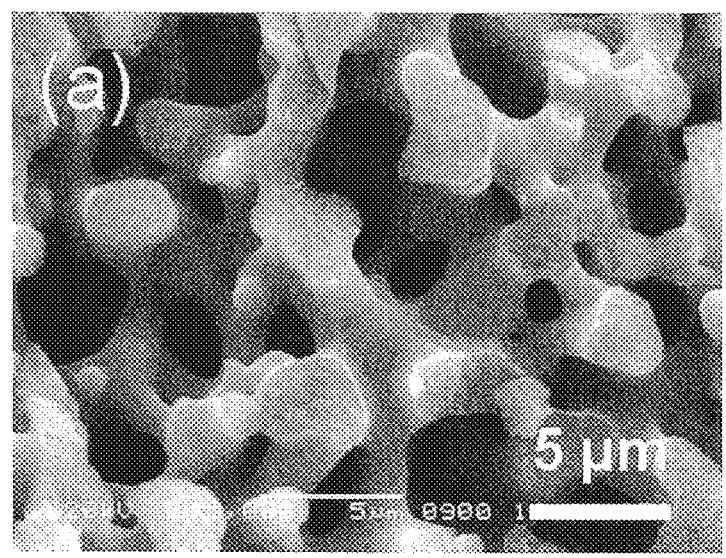
FIG. 1 shows an image observed by a scanning electron microscope (SEM) for a macroporous titanium dioxide monolith fabricated in an example.

The first embodiment of the present disclosure provides a macroporous titanium compound monolith including a co-continuous structure of a macropore and a framework that is composed of single-phase oxygen-deficient titanium oxide, the oxygen-deficient titanium oxide having electron conductivity derived from the oxygen-deficient titanium oxide.

The second embodiment provides the macroporous titanium compound monolith as set forth in the first embodiment, the macroporous titanium compound monolith having an electrical resistivity of $10^3 \Omega \cdot cm$ or less.

The third embodiment provides the macroporous titanium compound monolith as set forth in the first or second embodiment, wherein carbon particles and/or metal particles are placed within the framework and/or on a surface of the framework.

The fourth embodiment provides the macroporous titanium compound monolith as set forth in any one of the first to third embodiments, the macroporous titanium compound monolith being an electrode.

The fifth embodiment provides a method for producing a macroporous titanium compound monolith, the method including: placing a macroporous titanium dioxide monolith and a metal having titanium-reducing ability in a container, the macroporous titanium dioxide monolith having a co-continuous structure of a macropore and a framework that is composed of titanium dioxide; creating a vacuum atmosphere or an inert gas atmosphere within the container; and heating the monolith and the metal to cause gas-phase reduction that removes oxygen atom from the titanium dioxide composing the monolith by the metal acting as an oxygen getter, thereby obtaining a macroporous oxygen-deficient titanium oxide monolith having a co-continuous structure of the macropore and a framework that is composed of oxygen-deficient titanium oxide, the macroporous oxygen-deficient titanium oxide monolith having electron conductivity derived from the oxygen-deficient titanium oxide.

The sixth embodiment provides the method for producing a macroporous titanium compound monolith as set forth in the fifth embodiment, wherein the metal in the form of a foil is placed in the container.

The seventh embodiment provides the method for producing a macroporous titanium compound monolith as set forth in the fifth or sixth embodiment, wherein the metal is at least one selected from zirconium (Zr) and hafnium (Hf).

The eighth embodiment provides the method for producing a macroporous titanium compound monolith as set forth in any one of the fifth to seventh embodiments, wherein the heating is performed at a temperature of 900 to 1300° C.

The ninth embodiment provides the method for producing a macroporous titanium compound monolith as set forth in any one of the fifth to eighth embodiments, wherein the titanium dioxide composing the framework of the macroporous titanium dioxide monolith is of anatase type.

The tenth embodiment provides a macroporous titanium compound monolith including a co-continuous structure of a macropore and a framework that is composed of titanium oxynitride, the macroporous titanium compound monolith having electron conductivity derived from the titanium oxynitride.

The eleventh embodiment provides a method for producing a macroporous titanium compound monolith, the method including: placing a macroporous titanium compound monolith and a metal nitride in a container, the macroporous titanium compound monolith having a co-continuous structure of a macropore and a framework that is composed of titanium dioxide or oxygen-deficient titanium oxide; creating a vacuum atmosphere or an inert gas atmosphere within the container; and heating the monolith and the metal nitride to cause gas-phase reduction that removes oxygen atom from, and donates nitrogen atom to, the titanium compound composing the monolith by the metal nitride acting as an oxygen getter and as a nitrogen donor, thereby obtaining a macroporous titanium oxynitride monolith having a co-continuous structure of the macropore and a framework that is composed of titanium oxynitride, the macroporous titanium oxynitride monolith having electron conductivity derived from the titanium oxynitride.

The twelfth embodiment provides the method for producing a macroporous titanium compound monolith as set forth in the eleventh embodiment, wherein the metal nitride in the form of a powder is placed in the container.

The thirteenth embodiment provides the method for producing a macroporous titanium compound monolith as set forth in the eleventh or twelfth embodiment, wherein the metal nitride is at least one selected from titanium nitride, zirconium nitride, and hafnium nitride.

The fourteenth embodiment provides the method for producing a macroporous titanium compound monolith as set forth in any one of the eleventh to thirteenth embodiments, wherein the heating is performed at a temperature of 950 to 1200° C.

The fifteenth embodiment provides the method for producing a macroporous titanium compound monolith as set forth in any one of the eleventh to fourteenth embodiments, wherein the metal nitride, and the macroporous titanium dioxide monolith having a co-continuous structure of the macropore and a framework that is composed of titanium dioxide, are placed in the container.

The sixteenth embodiment provides a macroporous titanium compound monolith including a co-continuous structure of a macropore and a framework that is composed of titanium nitride, the macroporous titanium compound monolith having electron conductivity derived from the titanium nitride.

The seventeenth embodiment provides a method for producing a macroporous titanium compound monolith, the method including subjecting a macroporous titanium compound monolith having a co-continuous structure of a macropore and a framework that is composed of titanium dioxide, oxygen-deficient titanium oxide, or titanium oxynitride to a heat treatment in an ammonia-containing atmosphere at a temperature equal to or higher than a thermal decomposition temperature of ammonia, so as to cause gas-phase reduction that removes oxygen atom from, and donates nitrogen atom to, the titanium compound composing the monolith, thereby obtaining a macroporous titanium nitride monolith having a co-continuous structure of the macropore and a framework that is composed of titanium nitride, the macroporous titanium nitride monolith having electron conductivity derived from the titanium nitride.

The eighteenth embodiment provides the method for producing a macroporous titanium compound monolith as set forth in the seventeenth embodiment, wherein the heat treatment is performed at a temperature of 1000° C. or higher.

The nineteenth embodiment provides the method for producing a macroporous titanium compound monolith as set forth in the seventeenth or eighteenth embodiment, wherein the macroporous titanium dioxide monolith having a co-continuous structure of the macropore and a framework that is composed of titanium dioxide is subjected to the heat treatment in the ammonia-containing atmosphere at the temperature equal to or higher than the thermal decomposition temperature of ammonia.

In the present description, a "macroporous titanium compound monolith" refers to a titanium compound monolith having controlled macropores. "Controlled macropores" mean macropores that form a co-continuous structure together with a monolith framework, that have highly uniform diameters, and that do not include isolated pores (isolated macropores; the same applies hereinafter).

In the present description, a "macropore" refers to a pore having a diameter of 50 nm or more as advocated by IUPAC. Similarly, a "mesopore" refers to a pore having a diameter of 2 nm or more and less than 50 nm. A pore having a diameter of less than 2 nm is a "micropore". The diameters and the average diameter of pores can be determined by a common technique of pore distribution measurement such as pore distribution measurement by mercury intrusion or by nitrogen adsorption-desorption.

[Method for Producing Macroporous Oxygen-Deficient Titanium Oxide Monolith]

The method of the present invention for producing a macroporous oxygen-deficient titanium oxide monolith (hereinafter referred to as an oxygen-deficient monolith) uses a macroporous titanium dioxide monolith (hereinafter referred to as a dioxide monolith) as a precursor and a metal having titanium-reducing ability.

The dioxide monolith as a precursor has a co-continuous structure of macropores and a framework that is composed of titanium dioxide. As described above, this co-continuous structure has macropores whose diameters are highly uniform, and does not have isolated pores. In the method of the present invention for producing an oxygen-deficient monolith, the titanium compound composing the framework of the precursor monolith, i.e., titanium dioxide, is converted to oxygen-deficient titanium oxide. At this time, the structure as a macroporous monolith is preserved. Thus, an oxygen-deficient monolith is obtained in which the co-continuous structure of the framework and macropores in the precursor monolith is preserved. That is, in the co-continuous structure of the obtained oxygen-deficient monolith, the diameters of the macropores are highly uniform, and there are no isolated pores. In the case of a conventional molded article, such as Ebonex, which is made of oxygen-deficient titanium oxide powder particles aggregated (bound) together, macropore control as thus described cannot be achieved; instead, voids having random sizes and shapes are only observed to be present between the powder particles aggregated together.

It is preferable that the titanium dioxide composing the framework of the precursor monolith (dioxide monolith) be of the anatase type. In this case, an oxygen-deficient monolith (single-phase oxygen-deficient monolith) having a framework composed of oxygen-deficient titanium oxide with a single crystalline phase (which may be referred to as a "single phase") can be obtained. A single-phase oxygen-deficient monolith cannot be obtained from a dioxide monolith having a framework composed of rutile-type titanium dioxide. The formation of a single-phase oxygen-deficient monolith is one of the advantages of the present invention. For example, Ebonex is merely an mixed aggregate of a plurality of types of titanium powders differing in their oxygen deficiency states (differing in their oxidized states).

The dioxide monolith as a precursor may or may not have mesopores.

The method for forming the dioxide monolith as a precursor, i.e., a macroporous titanium dioxide monolith having a co-continuous structure of macropores and a framework composed of titanium dioxide is not particularly limited. For example, the dioxide monolith can be formed according to a method disclosed in Patent Literature 1 or 2. The dioxide monolith may be formed, for example, by a method disclosed by George Hasegawa et al. in "Facile Preparation of Hierarchically Porous $TiO_2$ Monoliths", Journal of American Ceramic Society, vol. 93 [10], pp. 3110-3115 (2010). In this case, the formation of the dioxide monolith having a framework composed of anatase-type titanium dioxide is further ensured. In this method, a dioxide monolith having a co-continuous structure of macropores and a framework composed of anatase-type titanium dioxide is formed by: a sol-gel reaction that involves phase separation and in which a chelate agent, a salt of a strong acid, and a phase separation controller are used; and removal of the chelate agent and aging in water subsequent to the sol-gel reaction. Also in the methods disclosed in Patent Literature 1 and 2, a co-continuous structure of a framework and macropores is formed by a sol-gel reaction involving phase separation. With these methods, a dioxide monolith having macropores controlled with high precision and high flexibility can be formed; for example, a dioxide monolith in which the diameters of the macropores are more uniform can be formed. That is, with the use of a dioxide monolith formed by any one of these methods, an oxygen-deficient monolith having macropores controlled with high precision and high flexibility is obtained; for example, an oxygen-deficient monolith in which the diameters of the macropores are more uniform is obtained. Such an oxygen-deficient monolith allows, for example, precise control of permeability to fluids.

The dioxide monolith as a precursor may be selected depending on the configuration of the framework and macropores of an oxygen-deficient monolith to be obtained (e.g., depending on the average diameter of the macropores, the porosity of the monolith, etc.).

The metal having titanium-reducing ability is not limited as long as it is a metal that has higher affinity to oxygen than titanium. For example, the metal is at least one selected from zirconium (Zr) and hafnium (Hf). As is clear from the fact that the metal having titanium-reducing ability "has higher affinity to oxygen than titanium", the metal does not include titanium itself.

In the oxygen-deficient monolith production method of the present invention, the dioxide monolith and the metal having titanium-reducing ability are placed in a container, a vacuum atmosphere or an inert gas atmosphere is created within the container, and the dioxide monolith and the metal are heated. This causes gas-phase reduction that removes oxygen atom from titanium dioxide composing the framework of the dioxide monolith by the metal acting as an oxygen getter.

The intention of placing the dioxide monolith and the metal in a container and creating a vacuum atmosphere or an inert gas atmosphere within the container is to carry out the gas-phase reduction stably and reliably. From this viewpoint, it is preferable that the container be a hermetic container capable of being hermetically closed after the dioxide monolith and the metal are placed in the container. The vacuum atmosphere and the inert gas atmosphere each mean an atmosphere in which the partial pressure of oxygen is very low (for example, $10^{-1}$ Pa or less, preferably $4 \times 10^{-2}$ Pa or less). This is because the higher the partial pressure of oxygen in the container is, the more the gas-phase reduction is hindered. The vacuum atmosphere is, for example, an atmosphere having a pressure of $10^{-3}$ to $10^{-1}$ Pa, and is preferably an atmosphere having a pressure of $2\times10^{-2}$ to $4\times10^{-2}$ Pa. The inert gas is, for example, nitrogen or argon. The pressure of the inert gas atmosphere is not particularly limited as long as the partial pressure of oxygen is very low.

It is preferable that the creation of the vacuum atmosphere or the inert gas atmosphere within the container be completed before the start of heating of the dioxide monolith and the metal. In other words, it is preferable to heat the dioxide monolith and the metal after creating a vacuum atmosphere or an inert gas atmosphere within the container in which the monolith and the metal have been placed. Also, it is preferable that the vacuum atmosphere or the inert gas atmosphere within the container be maintained while the gas-phase reduction is carried out. With these features, reoxidation of the dioxide monolith having once undergone reduction is inhibited, and the gas-phase reduction can be carried out more stably and reliably. The atmosphere in the container may be adjusted by employing commonly-known equipment and techniques so that the vacuum atmosphere or the inert gas atmosphere is maintained in the same state as before the heating. However, the composition of the resulting oxygen-deficient titanium oxide is easier to control when the container is sealed and the heating is performed after the vacuum atmosphere or the inert gas atmosphere is achieved. This is because continuously adjusting the atmosphere in the container during the heating causes oxygen released from titanium dioxide to be discharged outside the system without reaction with the metal, thus making it difficult to control the composition of the oxygen-deficient titanium oxide depending on the amount of the metal placed in the container.

The material composing the container is preferably a material that is neither altered nor corroded by the gas-phase reduction and that does not hinder the gas-phase reduction. Glass, quartz, stainless steel, and Monel alloy are suitable as the material used for the container.

It is preferable that the metal be in the form of a foil, that is, the metal in the form of a foil be placed in the container. In this case, the oxidation of the metal by oxygen released from titanium dioxide takes place efficiently (the capture by the metal of oxygen released from titanium dioxide takes place efficiently), and the gas-phase reduction can be carried out even more stably and reliably. From the viewpoint of the stability and the reliability of the gas-phase reduction, the average thickness of the metal foil is, for example, 0.01 μm to 100 μm, and is preferably 0.1 μm to 100 μm. The metal in the form of a powder may also be used. In this case, however, the controllability of the gas-phase reduction is slightly reduced because the surfaces of powder particles are likely to be oxidized and the degree of oxidation differs depending on the shapes of the particles.

The method for heating the dioxide monolith and the metal placed in the container is not particularly limited. For example, the entire container in which are placed the dioxide monolith and the metal may be placed in a furnace adjusted to the heating temperature. It is also allowable to perform the heating in an evacuated furnace.

The heating temperature for the dioxide monolith and the metal is not limited as long as the gas-phase reduction of the dioxide monolith proceeds at the temperature. The specific heating temperature differs depending on the type of the metal and on the pressure in the container during the gas-phase reduction. When the metal is zirconium, the heating temperature is, for example, 900° C. or higher and 1300° C. or lower, and is preferably 1000° C. or higher and 1200° C. or lower. When the heating temperature is too low, the gas-phase reduction does not proceed stably. When the heating temperature is too high, the co-continuous structure composed of uniform macropores is lost; in addition, a single-phase suboxide monolith cannot be obtained.

In the oxygen-deficient monolith production method of the present invention, the metal acts as an oxygen getter to remove oxygen atom from titanium dioxide composing the dioxide monolith. In such gas-phase reduction, the reduction reaction is allowed to proceed stably and reliably not only at the outer surface of the monolith but also within the macropores; consequently, an oxygen-deficient monolith retaining the co-continuous structure of the dioxide monolith which is a precursor (an oxygen-deficient monolith retaining the controlled macroporous structure) is obtained.

The oxygen-deficient monolith obtained has electron conductivity derived from the oxygen-deficient titanium oxide composing a framework presenting a co-continuous structure, that is, a continuous framework. The level of the electron conductivity depends on the physical properties of the oxygen-deficient titanium oxide itself composing the framework. The acquisition of the electron conductivity is accompanied by color change from the white of the dioxide monolith to the black of the oxygen-deficient monolith.

In the present description, "having (has) electron conductivity" refers to the fact that the monolith exhibits an electrical resistivity $\rho$ of $10^3\,\Omega\cdot$cm or less which at least indicates that the monolith is a semiconductor. Although such an electrical resistivity $\rho$ does not need to be exhibited at all temperatures, it is preferable that an electrical resistivity $\rho$ of $10^3\,\Omega\cdot$cm or less be exhibited, for example, at ordinary temperature. Depending on the temperature and on the composition of the material composing the framework of the fabricated monolith, the monolith may exhibit a lower electrical resistivity $\rho$, or specifically an electrical resistivity $\rho$ of, for example, $10^2\,\Omega\cdot$cm or less, 10 $\Omega\cdot$cm or less, 1 $\Omega\cdot$cm or less, or $10^{-1}$ $\Omega\cdot$cm or less.

The oxygen-deficient titanium oxide refers to reduced titanium oxide having a higher proportion of titanium than titanium dioxide (titanium oxide in which the molar equivalent of oxygen is smaller than that in titanium dioxide). The oxygen-deficient titanium oxide is, for example, titanium oxide represented by the formula $Ti_nO_{2n-1}$ (where n is 2, 3, 4, or 6). Although the oxygen-deficient titanium oxide does not need to have a composition satisfying the above formula, an oxygen-deficient monolith having a framework composed of oxygen-deficient titanium oxide satisfying the above formula can be obtained by adjusting the amount of the metal placed in the container so that the amount of the metal falls within an appropriate range relative to the dioxide monolith and by investing a sufficient time in the gas-phase reduction. For example, the appropriate range is such that the weight of the metal used is 5 weight % to 10 weight % greater than the stoichiometric weight necessary to convert all the titanium dioxide contained in the dioxide monolith to oxygen-deficient titanium oxide satisfying the above formula. The time for the gas-phase reduction required to produce oxygen-deficient titanium oxide satisfying the above formula differs depending on the size, shape, porosity, macropore diameters of the dioxide monolith, on the form of the metal placed in the container, and on the heating temperature. The required time is 1 day or longer in some cases. The composition of the oxygen-deficient titanium oxide can be evaluated by crystal structure analysis of the framework using X-ray diffraction (XRD).

The reaction formula of gas-phase reduction for obtaining $Ti_2O_3$ (n is 2 in the above formula) using zirconium as the metal is $4TiO_2+Zr\rightarrow 2Ti_2O_3+ZrO_2$. Similarly, the respective reaction formulae of gas-phase reduction for obtaining $Ti_3O_5$ (n is 3), $Ti_4O_7$ (n is 4), and $Ti_6O_{11}$ (n is 6) using zirconium as the metal are $6TiO_2+Zr \rightarrow 2Ti_3O_5+ZrO_2$, $8TiO_2+Zr \rightarrow 2Ti_4O_7+ZrO_2$, and $12TiO_2+Zr \rightarrow 2Ti_6O_{11}+ZrO_2$. The appropriate range of the weight of the metal placed in the container can be determined from these reaction formulae.

In one embodiment of the oxygen-deficient monolith production method of the present invention, a dioxide monolith having a framework composed of anatase-type titanium dioxide is selected as a precursor, the amount of the metal placed in the container relative to the dioxide monolith is adjusted within the appropriate range described above, and a sufficiently long time is invested in the gas-phase reduction. Consequently, an oxygen-deficient monolith having a framework composed of single-phase oxygen-deficient titanium oxide can be formed. This cannot be achieved by the method disclosed in Non Patent Literature 1 for forming a porous monolith made up of oxygen-deficient titanium oxide particles bound together, the method for forming Ebonex, or the method in which particles (e.g., carbon particles) having reactivity with oxygen atoms are mixed with a porous monolith of titanium dioxide in advance, and then reaction between the particles and the oxygen atoms of titanium dioxide is allowed to proceed with the aid of heat or the like so as to form a porous monolith having a framework composed of oxygen-deficient titanium. It is thought that heat during the heating also contributes to the formation of the framework composed of single-phase oxygen-deficient titanium oxide. Whether the framework of the resulting oxygen-deficient monolith is composed of single-phase oxygen-deficient titanium oxide can be determined by crystal structure analysis of the framework using X-ray diffraction (XRD) or by physical property analysis (e.g., conductivity analysis or magnetic property analysis) of the framework. For example, when any peaks other than the diffraction peaks attributed to a certain crystalline phase are not observed in an XRD pattern, the framework of the monolith can be regarded as having a single-phase structure of the certain crystalline phase.

In an oxygen-deficient monolith obtained by the oxygen-deficient monolith production method of the present invention, the structural properties of the macropores (e.g., the diameter and the shape) of the dioxide monolith which is a precursor are retained; however, mesopores present in the dioxide monolith may be lost due to heat during the gas-phase reduction.

An oxygen-deficient monolith obtained by the oxygen-deficient monolith production method of the present invention can be used in various applications depending on the configuration of the framework and macropores of the dioxide monolith which is a precursor. Taking the electron conductivity into account and also taking into account the high fluid permeability, the catalytic properties, and the handling strength which are derived from the co-continuous structure of the framework and macropores, the oxygen-deficient monolith can be used, for example, as an electrode such as a battery electrode, a gas sensor electrode having a surface on which a gas-sensitive functional thin film is provided, or a reactive electrode. With the use of the oxygen-deficient monolith as an electrode, various electrochemical reactions, such as oxidation, reduction, and synthesis of organic or inorganic compounds, can be allowed to proceed. Specific examples of the reactions include, but are not limited to, plating, oxidation of phenol, and reduction of carboxylic acids. With a thin film of an electrolyte such as a polymer electrolyte being provided as the functional thin film, the oxygen-deficient monolith can be used also as a fuel cell electrode. Taking into account further the fact that the oxygen-deficient titanium oxide is a wide-gap semiconductor that absorbs visible light and ultraviolet light, the oxygen-deficient monolith can be used as a photocatalytic material having water-decomposing properties or organic substance-decomposing properties or as an electrode of a solar cell or a dye-sensitized cell. Additional properties may be imparted to the oxygen-deficient monolith by doping with a dopant. For example, when ferroelectricity is imparted to the oxygen-deficient monolith by cation doping, it becomes conceivable to use the oxygen-deficient monolith in an electronic device. The oxygen-deficient monolith can be used also as a catalyst carrier.

The oxygen-deficient monolith production method of the present invention may include an optional step other than the above-described steps, as long as the oxygen-deficient monolith is obtained.

For example, the optional step is a step of placing particles (typically metal particles and/or carbon particles) within the framework of the macroporous monolith and/or on the surface of the framework (i.e., on the surfaces of the walls of the macropores). The oxygen-deficient monolith in which particles are placed within the framework and/or on the surface of the framework is expected to exhibit properties derived from the placed particles. When metal particles are placed, for example, an oxygen-deficient monolith that exhibits catalytic properties derived from the metal particles can be obtained depending on the type of the metal particles. Such an oxygen-deficient monolith that exhibits catalytic properties can be used, for example, as a reactive electrode. When carbon particles are placed, for example, an oxygen-deficient monolith presenting a high pore volume and a large surface area attributed to the carbon particles is obtained. Such an oxygen-deficient monolith in which carbon particles are placed is expected to present a high pore volume and a large specific surface area even when the mesopores in the framework are lost by heat during the gas-phase reduction.

The metal of the particles is, for example, at least one selected from platinum, gold, palladium, rhodium, ruthenium, silver, copper, nickel, iron, and aluminum, may be at least one selected from platinum, gold, palladium, rhodium, and ruthenium, or may be at least one selected from platinum and palladium.

As long as it is possible to carry out the production method of the present invention in which the dioxide monolith is subjected to gas-phase reduction to obtain an oxygen-deficient monolith, the method for placing particles within the framework of the oxygen-deficient monolith and/or on the surface of the framework is not limited. Examples of the method include:

(1) a method that yields an oxygen-deficient monolith in which particles are placed within the framework and/or on the surface of the framework by the gas-phase reduction carried out on a dioxide monolith in which the particles are placed within the framework and/or on the surface of the framework;

(2) a method that yields an oxygen-deficient monolith in which particles are placed within the framework and/or on the surface of the framework through the gas-phase reduction carried out on a dioxide monolith in which a precursor of the particles is placed within the framework and/or on the surface of the framework; and (3) a method in which an oxygen-deficient monolith is obtained by the gas-phase reduction carried out on a dioxide monolith, and then particles are placed within the framework of the oxygen-deficient monolith obtained and/or on the surface of the framework.

Any of the methods (1), (2), and (3) can be employed in placing carbon particles and metal particles. Also when carbon particles are placed in the dioxide monolith in the method (1), oxygen abstraction by the carbon particles from the dioxide monolith framework (oxidation of the carbon particles) is inhibited by the progress of the gas-phase reduction. Therefore, a single-phase oxygen-deficient monolith can be obtained.

As for the method (1), the placement of particles in a dioxide monolith can be carried out, for example, using any one of the following methods: (a) a method in which the dioxide monolith and a solution containing the particles are brought into contact, followed by drying; (b) a method in which the dioxide monolith and a solution containing a precursor of the particles are brought into contact, and then heat is applied to the dioxide monolith in a vacuum atmosphere, an inert gas atmosphere, or a reducing atmosphere so as to form the particles from the precursor; and (c) a method in which the dioxide monolith and a solution containing a precursor of the particles that are metal particles are brought into contact, and then the precursor is chemically reduced so as to form the particles from the precursor. The contact between the solution and the monolith is made, for example, by immersion of the monolith in the solution. The chemical reduction in the method (c) can be allowed to proceed, for example, by bringing a solution containing a reducing agent for the precursor into contact with the monolith. The reducing agent is, for example, formaldehyde, formic acid, or hydrazine. When the dioxide monolith is formed by a sol-gel method, the method (a), (b), or (c) may be performed in a situation where the monolith is in the form of a wet gel. For metal particles, the precursor of the particles is, for example, a salt of the metal, while for carbon particles, the precursor of the particles is, for example, a resin. The resin is, for example, poly(acrylic acid), poly(vinyl alcohol), poly(vinylpyrrolidone), or poly(acrylonitrile). It is preferable that, in the solution containing the precursor of the particles, the precursor be dissolved in the solution. In other words, it is preferable that the precursor of the particles have solubility in the solution to be brought into contact with the dioxide monolith. In this case, it is ensured that the particles are placed within the framework (within the mesopores) of the dioxide monolith. When, in the method (a), the size of metal particles contained in the solution is small, the metal particles can be placed within the framework (within the mesopores) of the dioxide monolith.

As for the method (2), the placement of the precursor of the particles in the dioxide monolith can be carried out in the same manner as in the method (1). The formation of the particles from the precursor can be carried out simultaneously with or after the gas-phase reduction, as long as the formation of the oxygen-deficient monolith from the dioxide monolith by the gas-phase reduction is not hindered. When carried out after the gas-phase reduction, the formation of the particles from the precursor may be carried out in the same manner as in the method (1).

As for the method (3), the placement of particles in the oxygen-deficient dioxide monolith obtained can be carried out, for example, by any one of the following methods: (a) a method in which the oxygen-deficient monolith and a solution containing the particles are brought into contact, followed by drying; (b) a method in which the oxygen-deficient monolith and a solution containing a precursor of the particles are brought into contact, and then heat is applied to the oxygen-deficient monolith in a vacuum atmosphere, an inert gas atmosphere, or a reducing atmosphere so as to form the particles from the precursor; (c) a method in which the dioxide monolith and a solution containing a precursor of the particles that are metal particles are brought into contact, and then the precursor is chemically reduced so as to form the particles from the precursor; and (d) a method in which the particles that are metal particles are formed by an electrochemical technique such as electrolytic plating by making use of the electrical conductivity of the oxygen-deficient monolith. The methods (a), (b), and (c) are similar to those in the method (1). When, in the method (d), the mesopores remain in the oxygen-deficient monolith, the placement of the particles within the framework (within the mesopores) of the monolith is further ensured.

The size of the placed particles is not particularly limited. The size is, for example, 2 nm to 1 μm, and is preferably 2 nm to 100 nm. For use as a catalyst, the size is particularly preferably 10 nm or less.

[Macroporous Oxygen-Deficient Titanium Oxide Monolith]

The oxygen-deficient monolith of the present invention has a co-continuous structure of macropores and a framework composed of single-phase (single crystalline phase) oxygen-deficient titanium oxide, and has electron conductivity derived from the oxygen-deficient titanium oxide. As described above, this co-continuous structure has macropores whose diameters are highly uniform, and does not have isolated pores. The oxygen-deficient titanium oxide is, for example, titanium oxide represented by the formula $Ti_nO_{2n-1}$ (where n is 2, 3, 4, or 6). The level of the electron conductivity depends on the physical properties of the oxygen-deficient titanium oxide itself composing the framework of the monolith. The electrical resistivity is, for example, $10^3 \Omega\cdot cm$ or less, and is preferably $10^3 \Omega\cdot cm$ or less at ordinary temperature. Depending on the temperature and on the composition of the oxygen-deficient titanium oxide composing the framework of the monolith, the electrical resistivity is, for example, $10^2 \Omega\cdot cm$ or less, $10 \Omega\cdot cm$ or less, $1 \Omega\cdot cm$ or less, or even $10^{-1} \Omega\cdot cm$ or less.

The oxygen-deficient monolith of the present invention may or may not have mesopores.

In the oxygen-deficient monolith of the present invention, particles that are, for example, carbon particles and/or metal particles may be placed within the framework (within the mesopores) of the monolith and/or on the surface of the framework (on the surfaces of the walls of the macropores). The metal particles and the carbon particles are as described above for the oxygen-deficient monolith production method.

The oxygen-deficient monolith of the present invention can be formed, for example, by the oxygen-deficient monolith production method of the present invention.

The oxygen-deficient monolith of the present invention can be used in various applications depending on the configuration of its framework and macropores. Specific examples of the applications are as described above for the oxygen-deficient monolith production method of the present invention.

[Method for Producing Macroporous Titanium Oxynitride Monolith]

The method of the present invention for producing a macroporous titanium oxynitride monolith (hereinafter referred to as an oxynitride monolith) uses a dioxide monolith or an oxygen-deficient monolith as a precursor and a metal nitride.

The precursor monolith has a co-continuous structure of macropores and a framework that is composed of titanium dioxide or oxygen-deficient titanium oxide. As described above, this co-continuous structure has macropores whose diameters are highly uniform, and does not have isolated pores. In the oxynitride monolith production method of the present invention, the titanium compound composing the framework of the precursor monolith, i.e., titanium dioxide or oxygen-deficient titanium oxide, is converted to titanium oxynitride. At this time, the structure as a macroporous monolith is preserved. Thus, an oxynitride monolith is obtained in which the co-continuous structure of the framework and macropores in the precursor monolith is preserved. That is, in the co-continuous structure of the obtained oxynitride monolith, the diameters of the macropores are highly uniform, and there are no isolated pores. In the case of a molded article made of titanium oxynitride powder particles aggregated (bound) together, macropore control as thus described cannot be achieved; instead, voids having random sizes and shapes are only observed to be present between the powder particles aggregated together. The oxygen-deficient titanium oxide is as described above for the oxygen-deficient monolith production method of the present invention.

When the precursor monolith is a dioxide monolith, the crystalline system of titanium dioxide composing the framework of the monolith is not limited, and the titanium dioxide may be of the anatase type or rutile type. The precursor monolith may or may not have mesopores.

The method for forming the dioxide monolith as a precursor is not particularly limited, and is as described above for the oxygen-deficient monolith production method of the present invention. For example, the dioxide monolith can be formed according to a method disclosed in Patent Literature 1 or 2 or disclosed by George Hasegawa et al. With these methods, a dioxide monolith having macropores controlled with high precision and high flexibility can be formed; for example, a dioxide monolith in which the diameters of the macropores are more uniform can be formed. That is, with the use of a dioxide monolith formed by any one of these methods, an oxynitride monolith having macropores controlled with high precision and high flexibility is obtained; for example, an oxynitride monolith in which the diameters of the macropores are more uniform is obtained. Such an oxynitride monolith allows, for example, precise control of permeability to fluids.

The method for forming the oxygen-deficient monolith as a precursor is not particularly limited, and the oxygen-deficient monolith can be formed, for example, according to the oxygen-deficient monolith production method of the present invention. With this method, an oxygen-deficient monolith having macropores controlled with high precision and high flexibility can be formed; for example, an oxygen-deficient monolith in which the diameters of the macropores are more uniform can be formed. That is, with the use of an oxygen-deficient monolith formed by this method, an oxynitride monolith having macropores controlled with high precision and high flexibility is obtained; for example, an oxynitride monolith in which the diameters of the macropores are more uniform is obtained.

In the oxynitride monolith production method of the present invention, for example, gas-phase reduction may be performed using a dioxide monolith as a precursor monolith; more specifically, gas-phase reduction may be performed in a container in which are placed a metal nitride and a dioxide monolith having a co-continuous structure of macropores and a framework composed of titanium dioxide.

The dioxide monolith or the oxygen-deficient monolith as a precursor may be selected depending on the configuration of the framework and macropores of an oxynitride monolith to be obtained (e.g., depending on the average diameter of the macropores, the porosity of the monolith, etc.).

In the oxynitride monolith production method of the present invention, a precursor monolith and a metal nitride are placed in a container, a vacuum atmosphere or an inert gas atmosphere is created in the container, and the monolith and the metal nitride are heated. This causes gas-phase reduction that removes oxygen atom from, and donates nitrogen atom to, titanium dioxide or oxygen-deficient titanium oxide composing the framework of the precursor monolith by the metal nitride acting as an oxygen getter as well as a nitrogen donor.

The metal nitride is not limited as long as it is capable of removing oxygen atom from titanium dioxide or oxygen-deficient titanium oxide and also capable of donating nitrogen atom to this titanium compound during the gas-phase reduction. The metal nitride is, for example, at least one selected from titanium nitride (TiN), zirconium nitride (ZrN), and hafnium nitride (HfN). Each of these nitrides is a nitride of titanium or an element belonging to the same Group 4 as titanium, and thus has an appropriate ability to reduce titanium dioxide and oxygen-deficient titanium oxide. Therefore, these nitrides are preferable for forming titanium oxynitride by the gas-phase reduction. The metal nitride used may be a metal nitride having the same level of stability (equilibrium oxygen partial pressure) as the above nitrides.

The intention of placing the precursor monolith and the metal nitride in a container and creating a vacuum atmosphere or an inert gas atmosphere within the container is to carry out the gas-phase reduction stably and reliably. From this viewpoint, it is preferable that the container be a hermetic container capable of being hermetically closed after the precursor monolith and the metal oxide are placed in the container. The vacuum atmosphere and the inert gas atmosphere are as described above for the oxygen-deficient monolith production method of the present invention. The pressure of the inert gas atmosphere is not particularly limited as long as the partial pressure of oxygen is very low (for example, $10^{-1}$ Pa or less, preferably $4 \times 10^{-2}$ Pa or less).

It is preferable that the creation of the vacuum atmosphere or the inert gas atmosphere within the container be completed before the start of heating of the precursor monolith and the metal nitride. In other words, it is preferable to heat the precursor monolith and the metal nitride after creating a vacuum atmosphere or an inert gas atmosphere within the container in which the monolith and the metal nitride are placed. Also, it is preferable that the vacuum atmosphere or the inert gas atmosphere in the container be maintained while the gas-phase reduction is carried out. With these features, reoxidation of the precursor monolith having once undergone reduction is inhibited, and the gas-phase reduction involving nitridation can be carried out more stably and reliably. Commonly-known equipment and techniques can be applied in the adjustment of the atmosphere in the container. It is preferable to seal the container and perform the heating after achieving the vacuum atmosphere or the inert gas atmosphere.

The material composing the container is as described above for the oxygen-deficient monolith production method of the present invention.

It is preferable that the metal nitride be in the form of a powder, that is, the metal nitride in the form of a powder be placed in the container. In this case, the capture by the metal nitride of oxygen released from titanium dioxide or oxygen-deficient titanium oxide takes place efficiently, and the transfer of a nitrogen species by the heating from the metal nitride to the gas phase takes place efficiently. Therefore, the gas-phase reduction involving nitridation can be carried out even more stably and reliably. From the viewpoint of the stability and the reliability of the gas-phase reduction, the average particle diameter of the powder is, for example, 0.01 μm to 100 μm, and is preferably 10 μm to 100 μm.

The amount of the metal nitride placed in the container relative to the precursor monolith differs depending on the type of the metal nitride and the heating temperature. The amount of the metal nitride is, for example, 2 to 100 parts by weight, and is preferably 50 to 100 parts by weight per 100 parts by weight of the precursor monolith. The time for the gas-phase reduction differs depending on the size, shape, porosity, macropore diameters of the precursor monolith, on the form of the metal nitride placed in the container, and on the heating temperature. The required time is 1 day or longer in some cases.

The method for heating the precursor monolith and the metal nitride placed in the container is not particularly limited. For example, the entire container in which are placed the precursor monolith and the metal nitride may be placed in a furnace adjusted to the heating temperature. It is also allowable to perform the heating in an evacuated furnace.

The heating temperature for the precursor monolith and the metal nitride is not limited as long as the gas-phase reduction involving nitridation of the precursor monolith proceeds at the temperature. The specific heating temperature differs depending on the type of the metal nitride and on the pressure in the container during the gas-phase reduction. When the metal nitride is at least one selected from titanium nitride, zirconium nitride, and hafnium nitride, the heating temperature is, for example, 950° C. or higher and 1200° C. or lower, and is preferably 1000° C. or higher and 1200° C. or lower. When the heating temperature is too low, the gas-phase reduction does not proceed stably. When the heating temperature is too high, a single-phase oxynitride monolith cannot be obtained.

In the oxynitride monolith production method of the present invention, the metal nitride acts as an oxygen getter and as a nitrogen donor to remove oxygen atom from titanium dioxide or oxygen-deficient titanium oxide composing the precursor monolith and at the same time to donate nitrogen atom to the titanium compound. In such gas-phase reduction, the reduction reaction is allowed to proceed stably and reliably not only at the outer surface of the monolith but also within the macropores; consequently, an oxynitride monolith retaining the co-continuous structure of the precursor monolith (an oxynitride monolith retaining the controlled macroporous structure) is obtained.

The oxynitride monolith obtained has electron conductivity derived from the titanium oxynitride composing a framework presenting a co-continuous structure, that is, a continuous framework. The level of the electron conductivity depends on the physical properties of the titanium oxynitride itself composing the framework. When a dioxide monolith is used as a precursor, the acquisition of the electron conductivity is accompanied by color change from the white of the dioxide monolith to the black of the oxynitride monolith.

In one embodiment of the oxynitride monolith production method of the present invention, the amount of the metal nitride placed in the container relative to the precursor monolith is adjusted within the appropriate range described above, and a sufficiently long time is invested in the gas-phase reduction. Consequently, an oxynitride monolith having a framework composed of single-phase titanium oxynitride can be formed. It is thought that heat during the heating also contributes to the formation of the framework composed of single-phase titanium oxynitride. Whether the framework of the resulting oxynitride monolith is composed of single-phase titanium oxynitride can be determined by crystal structure analysis of the framework using X-ray diffraction (XRD) or by physical property analysis (e.g., magnetic property analysis) of the framework.

In an oxynitride monolith obtained by the oxynitride monolith production method of the present invention, the structural properties of the macropores (e.g., the diameter and the shape) of the precursor monolith are retained; however, mesopores present in the precursor monolith may be lost due to heat during the gas-phase reduction.

An oxynitride monolith obtained by the oxynitride monolith production method of the present invention can be used in various applications depending on the configuration of the framework and macropores of the precursor monolith. Specific examples of the applications are the same as those described above for the oxygen-deficient monolith production method of the present invention. Similarly to oxygen-deficient titanium oxide, titanium oxynitride is a wide-gap semiconductor that absorbs visible light and ultraviolet light, and can be endowed with ferroelectricity by cation doping.

The oxynitride monolith production method of the present invention may include an optional step other than the above-described steps, as long as the oxynitride monolith is obtained.

For example, the optional step is a step of placing particles (typically metal particles and/or carbon particles) within the framework of the macroporous monolith and/or on the surface of the framework. Examples of the method for carrying out this step, the types of the particles, and the effects obtained by the placement of the particles, are as described above for the oxygen-deficient monolith production method. However, the precursor monolith and the resulting monolith differ between the oxygen-deficient monolith production method and the oxynitride monolith production method. Therefore, when the exemplary method (1), (2), or (3) described above is employed for the oxynitride monolith, the precursor monolith is interpreted as "dioxide monolith or oxygen-deficient monolith" and the resulting monolith is interpreted as "oxynitride monolith obtained".

[Macroporous Titanium Oxynitride Monolith]

The oxynitride monolith of the present invention has a co-continuous structure of macropores and a framework composed of titanium oxynitride, and has electron conductivity derived from the titanium oxynitride. As described above, this co-continuous structure has macropores whose diameters are highly uniform, and does not have isolated pores. The level of the electron conductivity depends on the physical properties of the titanium oxynitride itself composing the framework of the monolith.

The framework of the oxynitride monolith of the present invention may be composed of single-phase (single crystalline phase) titanium oxynitride.

The oxynitride monolith of the present invention may or may not have mesopores.

In the oxynitride monolith of the present invention, particles that are, for example, carbon particles and/or metal particles may be placed within the framework (within the mesopores) of the monolith and/or on the surface of the framework (on the surfaces of the walls of the macropores). The metal particles and the carbon particles are as described above for the oxygen-deficient monolith production method.

The oxynitride monolith of the present invention can be formed, for example, by the oxynitride monolith production method of the present invention.

The oxynitride monolith of the present invention can be used in various applications depending on the configuration of its framework and macropores. Specific examples of the applications are the same as those for the oxygen-deficient monolith of the present invention.

[Method for Producing Macroporous Titanium Nitride Monolith]

The method of the present invention for producing a macroporous titanium nitride monolith (hereinafter referred to as a nitride monolith) uses a dioxide monolith, an oxygen-deficient monolith or an oxynitride monolith as a precursor, and uses ammonia.

The dioxide monolith which is one example of the precursor has a co-continuous structure of macropores and a framework composed of titanium dioxide. The oxygen-deficient monolith which is another example of the precursor has a co-continuous structure of macropores and a framework composed of oxygen-deficient titanium oxide. The oxynitride monolith which is still another example of the precursor has a co-continuous structure of macropores and a framework composed of titanium oxynitride. As described above, these co-continuous structures have macropores whose diameters are highly uniform, and do not have isolated pores. The oxygen-deficient titanium oxide is as described above for the oxygen-deficient monolith production method of the present invention.

In the nitride monolith production method of the present invention, the titanium compound composing the framework of the precursor monolith, i.e., titanium dioxide, oxygen-deficient titanium oxide, or titanium oxynitride, is converted to titanium nitride. At this time, the structure as a macroporous monolith is preserved. Thus, a nitride monolith is obtained in which the co-continuous structure of the framework and macropores in the precursor monolith is preserved. That is, in the co-continuous structure of the obtained nitride monolith, the diameters of the macropores are highly uniform, and there are no isolated pores. In the case of a molded article made of titanium nitride powder particles aggregated (bound) together, macropore control as thus described cannot be achieved; instead, voids having random sizes and shapes are only observed to be present between the powder particles aggregated together.

When the precursor monolith is a dioxide monolith, the crystalline system of titanium dioxide composing the framework of the monolith is not limited, and the titanium dioxide may be of the anatase type or rutile type. The precursor monolith may or may not have mesopores.

The method for forming the dioxide monolith as a precursor is not particularly limited, and is as described above for the oxygen-deficient monolith production method of the present invention. For example, the dioxide monolith can be formed according to a method disclosed in Patent Literature 1 or 2 or disclosed by George Hasegawa et al. With these methods, a dioxide monolith having macropores controlled with high precision and high flexibility can be formed; for example, a dioxide monolith in which the diameters of the macropores are more uniform can be formed. That is, with the use of a dioxide monolith formed by any one of these methods, a nitride monolith having macropores controlled with high precision and high flexibility is obtained; for example, a nitride monolith in which the diameters of the macropores are more uniform is obtained. Such a nitride monolith allows, for example, precise control of permeability to fluids.

The method for forming the oxygen-deficient monolith as a precursor is not particularly limited, and the oxygen-deficient monolith can be formed, for example, according to the oxygen-deficient monolith production method of the present invention. The method for forming the oxynitride monolith as a precursor is not particularly limited, and the oxynitride monolith can be formed, for example, according to the oxynitride monolith production method of the present invention. With these methods, an oxygen-deficient monolith or an oxynitride monolith having macropores controlled with high precision and high flexibility can be formed; for example, an oxygen-deficient monolith or an oxynitride monolith in which the diameters of the macropores are more uniform can be formed. That is, with the use of an oxygen-deficient monolith or an oxynitride monolith formed by either of the methods, a nitride monolith having macropores controlled with high precision and high flexibility is obtained; for example, a nitride monolith in which the diameters of the macropores are more uniform is obtained.

In the nitride monolith production method of the present invention, for example, a dioxide monolith, or more specifically a dioxide monolith having a co-continuous structure of macropores and a framework composed of titanium dioxide, may be used as a precursor monolith subjected to a heat treatment in an ammonia-containing atmosphere at a temperature equal to or higher than the thermal decomposition temperature of ammonia.

The dioxide monolith, the oxygen-deficient monolith, or the oxynitride monolith as a precursor may be selected depending on the configuration of the framework and macropores of a nitride monolith to be obtained (e.g., depending on the average diameter of the macropores, the porosity of the monolith, etc.).

In the nitride monolith production method of the present invention, the precursor monolith is subjected to a heat treatment in an ammonia-containing atmosphere at a temperature equal to or higher than the thermal decomposition temperature of ammonia. This causes gas-phase reduction in which reactive hydrogen and reactive nitrogen generated by the thermal decomposition of ammonia act as an oxygen getter as well as a nitrogen donor to remove oxygen atom from, and donate nitrogen atom to, titanium dioxide, oxygen-deficient titanium oxide, or titanium oxynitride composing the framework of the precursor monolith.

It is sufficient that the atmosphere for the heat treatment of the precursor monolith be an ammonia-containing atmosphere. For example, the atmosphere is an ammonia atmosphere. It is preferable that the partial pressure of oxygen in the atmosphere be very low (for example, $10^{-1}$ Pa or less, preferably $4 \times 10^{-2}$ Pa or less). The pressure of the atmosphere is not particularly limited. The ammonia atmosphere can be created, for example, by placing the precursor monolith in a container and introducing ammonia into the container which is then hermetically closed or by continuously introducing ammonia into the container. Commonly-known equipment and techniques can be applied in the introduction of ammonia into the container and the adjustment of the atmosphere in the container.

The material composing the container is as described above for the oxygen-deficient monolith production method of the present invention.

The heat treatment temperature is equal to or higher than the thermal decomposition temperature of ammonia (400 to 500° C.), and is, for example, 600° C. or higher. In the nitride monolith production method of the present invention, by making use of generation of reactive hydrogen and reactive nitrogen due to thermal decomposition of ammonia, the ammonia is allowed to function not only as an oxygen getter but also as a nitrogen-atom donor. From the viewpoint of carrying out efficient gas-phase reduction, it is preferable that the heat treatment temperature be 1000° C. or higher.

The method for the heat treatment is not particularly limited. For example, a container in which the precursor monolith is placed and in which ammonia is confined or into which ammonia continuously flows may be placed in a furnace adjusted to the heat treatment temperature.

The heat treatment time (the time for the gas-phase reduction) differs depending on the size, shape, porosity, macropore diameters of the precursor monolith and on the heat treatment temperature. The required time is several hours or 1 day or longer in some cases.

In the nitride monolith production method of the present invention, ammonia thermally decomposed by heat in the heat treatment acts as an oxygen getter and as a nitrogen donor to remove oxygen atom from titanium dioxide, oxygen-deficient titanium oxide, or titanium oxynitride composing the precursor monolith and at the same time to donate nitrogen atom to the titanium compound. In such gas-phase reduction, the reduction reaction is allowed to proceed stably and reliably not only at the outer surface of the monolith but also within the macropores; consequently, a nitride monolith retaining the co-continuous structure of the precursor monolith (a nitride monolith retaining the controlled macroporous structure) is obtained. Titanium nitride has a very high melting point and a very high hardness and is a material that is difficult to subject to molding and microfabrication. However, with the nitride monolith production method of the present invention, it is possible to relatively easily produce a macroporous monolith having a framework composed of such a material that is difficult to subject to molding and microfabrication.

The nitride monolith obtained has electron conductivity derived from the titanium nitride composing a framework presenting a co-continuous structure, that is, a continuous framework. The level of the electron conductivity depends on the physical properties of the titanium nitride itself composing the framework. When a dioxide monolith is used as a precursor, the acquisition of the electron conductivity is accompanied by color change from the white of the dioxide monolith to the dark brown of the oxynitride monolith.

In a nitride monolith obtained by the nitride monolith production method of the present invention, the structural properties of the macropores (e.g., the diameter and the shape) of the precursor monolith are retained; however, mesopores present in the precursor monolith may be lost due to heat during the gas-phase reduction. Conversely, mesopores not present in the precursor monolith appear in the nitride monolith in some cases, such as when $Ti_2O_3$ and ammonia react with each other.

A nitride monolith obtained by the nitride monolith production method of the present invention can be used in various applications depending on the configuration of the framework and macropores of the precursor monolith. Specific examples of the applications are the same as those described above for the oxygen-deficient monolith production method of the present invention. Titanium nitride is expected to be used as a capacitor, a catalyst (for conversion of an alkyne to a cis-alkene by hydrogenation), or a catalyst carrier (for oxidation of methanol), and also is a superconductor having a transition temperature of about 5 K.

The nitride monolith production method of the present invention may include an optional step other than the above-described steps, as long as the nitride monolith is obtained.

For example, the optional step is a step of placing particles (typically metal particles and/or carbon particles) within the framework of the macroporous monolith and/or on the surface of the framework. Examples of the method for carrying out this step, the types of the particles, and the effects obtained by the placement of the particles, are as described above for the oxygen-deficient monolith production method. However, the precursor monolith and the resulting monolith differ between the oxygen-deficient monolith production method and the nitride monolith production method. Therefore, when the exemplary method (1), (2), or (3) described above is employed for the nitride monolith, the precursor monolith is interpreted as "dioxide monolith, oxygen-deficient monolith, or oxynitride monolith" and the resulting monolith is interpreted as "nitride monolith obtained".

[Macroporous Titanium Nitride Monolith]

The nitride monolith of the present invention has a co-continuous structure of macropores and a framework composed of titanium nitride, and has electron conductivity derived from the titanium nitride. As described above, this co-continuous structure has macropores whose diameters are highly uniform, and does not have isolated pores. The level of the electron conductivity depends on the physical properties of the titanium nitride itself composing the framework of the monolith.

The framework of the nitride monolith of the present invention may be composed of single-phase (single crystalline phase) titanium nitride.

The nitride monolith of the present invention may or may not have mesopores.

In the nitride monolith of the present invention, particles that are, for example, carbon particles and/or metal particles may be placed within the framework (within the mesopores) of the monolith and/or on the surface of the framework (on the surfaces of the walls of the macropores). The metal particles and the carbon particles are as described above for the oxygen-deficient monolith production method.

The nitride monolith of the present invention can be formed, for example, by the nitride monolith production method of the present invention.

The nitride monolith of the present invention can be used in various applications depending on the configuration of its framework and macropores. Specific examples of the applications are the same as those for the oxygen-deficient monolith of the present invention.

EXAMPLES

[Fabrication of Precursor Monolith]

A dioxide monolith as a precursor was fabricated according to a method disclosed by George Hasegawa et al. Specifically, the monolith was fabricated by the procedures described below.

In a glass container were thoroughly mixed 10 mL of titanium propoxide (titanium (IV) propoxide), 7.0 mL of 1-propanol, and 5.0 mL of ethyl acetylacetonate as a chelate agent for reducing the rate of hydrolysis of the titanium propoxide. Thus, a homogeneous yellow solution was obtained. Next, 0.875 g of poly(ethylene glycol) having a molecular weight of 10,000 was added to the obtained solution, and the temperature of the solution was increased to 60° C. to completely dissolve the added poly(ethylene oxide) in the solution. Next, the temperature of the solution was decreased to 40° C., and with vigorous stirring of the solution, 2.0 mL of a 1M ammonium nitrate solution as a strong acid salt for reducing the rate of hydrolysis of the titanium propoxide was slowly added. Next, the stirring was further continued for 3 minutes, after which the resulting homogeneous solution was left at 40° C. for 24 hours to obtain a wet gel. The typical gelation time for this sample was 30 minutes to 1 hour.

Next, the temperature of the container was increased to 60° C., the solvent was replaced by ethanol, and the reaction system was left for 8 hours or longer. Thereafter, the solvent was replaced sequentially by five types of ethanol-water mixed solutions differing in mixing ratio between ethanol and water. The mixing ratios in the ethanol-water mixed solutions were, in order of use in replacement, ethanol/water=9/1, ethanol/water=8/2, ethanol/water=7/3, ethanol/water=1/1, and ethanol/water=3/7 (all the ratios are weight ratios). The intervals between the solvent replacements were 8 hours or longer. Next, the solvent was replaced by water, and the reaction system was left at 60° C. for 24 hours, followed by drying at 40° C. for 48 hours to obtain a dry gel.

Figure 2:
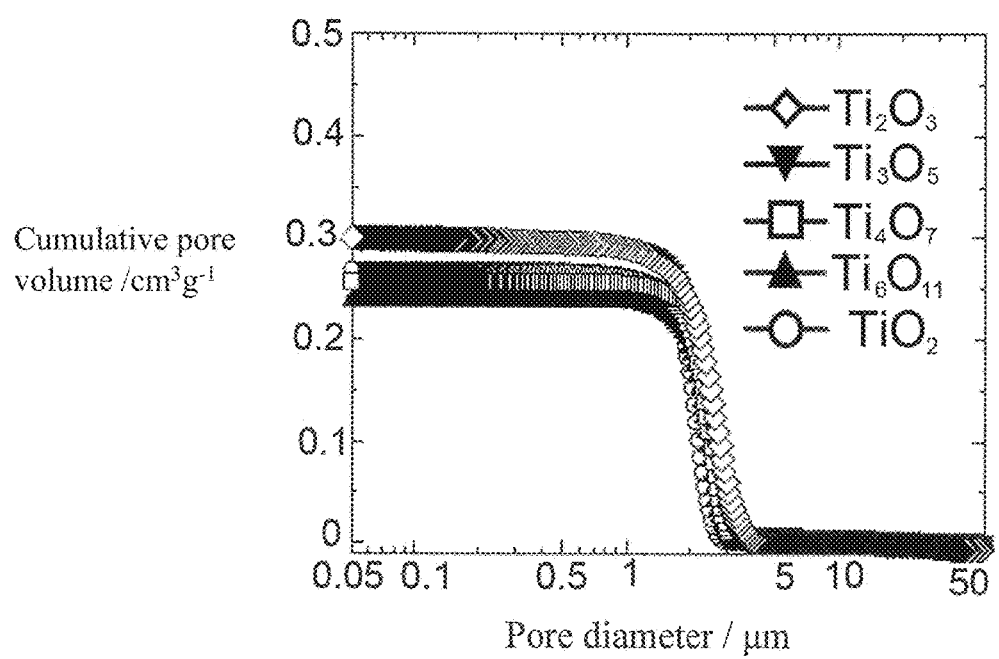
FIG. 2 shows results of pore distribution measurements by mercury intrusion on macroporous oxygen-deficient titanium oxide monoliths and a macroporous titanium dioxide monolith which were fabricated in an example.
Figure 3:
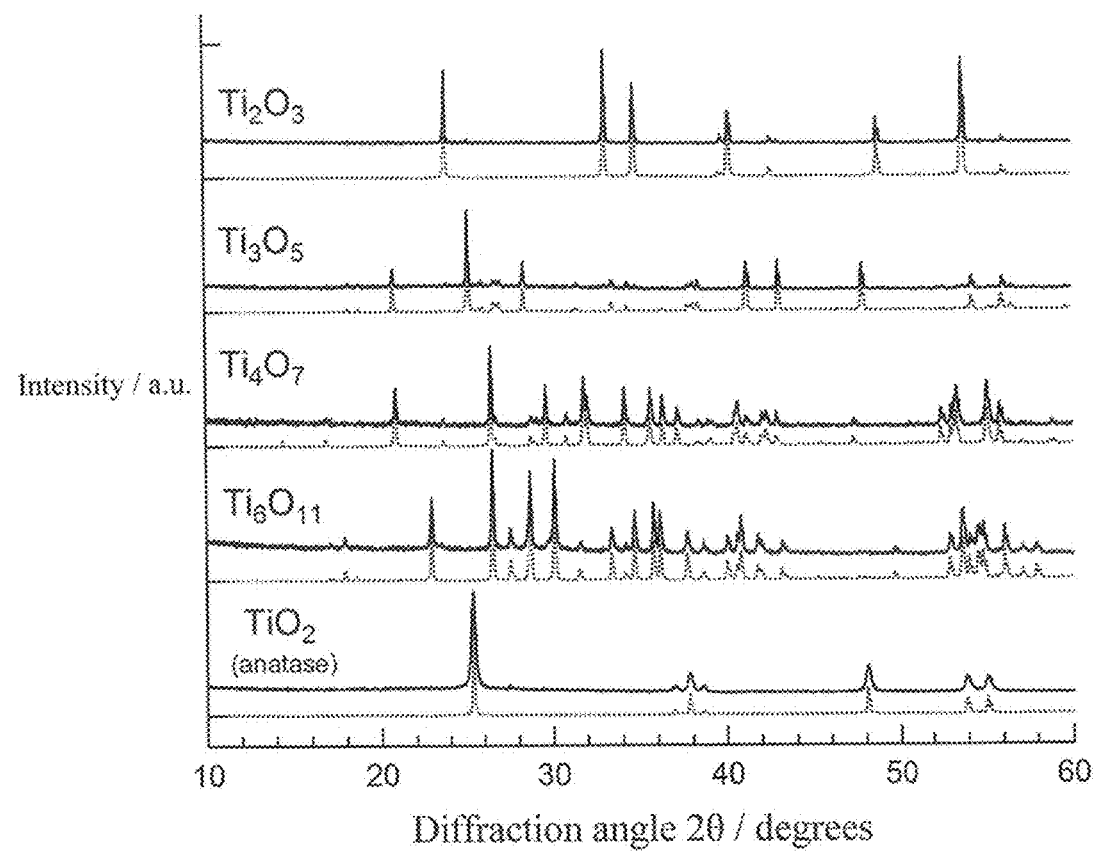
FIG. 3 shows diffraction peaks observed in X-ray diffraction (XRD) measurements on macroporous oxygen-deficient titanium oxide monoliths and a macroporous (anatase-type) titanium dioxide monolith which were fabricated in an example.

Next, the obtained dry gel was sintered at 600° C. to remove the remaining organic substance, and thus a dioxide monolith A having a framework composed of titanium dioxide was obtained. An image of the obtained dioxide monolith A observed by a scanning electron microscope (SEM) is shown in FIG. 1, results of pore distribution measurements by mercury intrusion are shown in FIG. 2, and XRD peaks of the material composing the framework are shown in FIG. 3. In FIGS. 2 and 3, the results indicated by "$TiO_2$" are those for the dioxide monolith A. In FIG. 3, the dashed lines represent the respective theoretical diffraction peaks of the titanium oxides, while the solid lines represent the diffraction peaks actually measured for the dioxide monolith A and the oxygen-deficient monoliths fabricated in Example 1. The results shown in FIGS. 1 to 3 confirmed that the dioxide monolith A was a macroporous monolith having a co-continuous structure of macropores and a framework composed of anatase-type titanium dioxide. In addition, the result shown in FIG. 2 confirmed that, in the dioxide monolith A, the diameters of the macropores were highly uniform.

Unless otherwise specified, the pore distributions of the monolith A and the other fabricated monoliths described hereinafter are those which were measured using a pore distribution measuring apparatus (Pore Master 60-GT manufactured by Quantachrome Instruments) in the range from 0.05 to 50 μm. The XRD peaks of the materials composing the frameworks of the monolith A and the other fabricated monoliths described hereinafter are those which were measured using a wide-angle X-ray diffractometer (D8 Advance manufactured by Bruker Corporation) in the diffraction angle 2θ range from 10 to 60 degrees. At that time, the framework of the monolith was pulverized into a powder, the obtained powder was then charged into a cell for powder samples, and the X-ray diffraction measurement was performed by a reflection method.

Example 1: Fabrication of Oxygen-Deficient Monoliths

Oxygen-deficient monoliths were fabricated from the dioxide monolith A fabricated as described above. Specifically, the oxygen-deficient monoliths were fabricated by the procedures described below.

The dioxide monolith A and a zirconium foil (with an average thickness of 100 μm) were placed in a quartz tube, and the quartz tube was tightly closed. The amount of the zirconium foil placed in the quartz tube was adjusted to be 5 to 10 weight % greater than the stoichiometric amount necessary to reduce and convert the titanium dioxide composing the dioxide monolith framework into oxygen-deficient titanium oxide. Four samples differing in the amount of the zirconium foil were prepared for the purpose of forming frameworks composed of four types of oxygen-deficient titanium oxide ($Ti_2O_3$, $Ti_3O_5$, $Ti_4O_7$, and $Ti_6O_{11}$). Next, a vacuum with a pressure of $4 \times 10^{-2}$ Pa was created within the quartz tube, which was sealed so that gases could not enter or exit the quartz tube any more. Next, the entire tube was put into an electric furnace, and the temperature of the furnace was increased at a temperature increase rate of 100° C. per hour; thus, heating treatment was performed at 1050° C. (for fabrication of the monoliths of $Ti_4O_7$ and $Ti_6O_{11}$) and at 1150° C. (for fabrication of the monoliths of $Ti_2O_3$ and $Ti_3O_5$) for 24 hours. After the heating treatment, the inside of the furnace was cooled to room temperature at a temperature decrease rate of 100° C. per hour, and then the quartz tube was taken out from the electric furnace. After the quartz tube was naturally cooled, the quartz tube was unsealed, and the monolith was taken out from the inside of the quartz tube. The color of the monolith A before the heating treatment was white, whereas the color of the monolith after the heating treatment was black.

Figure 4:
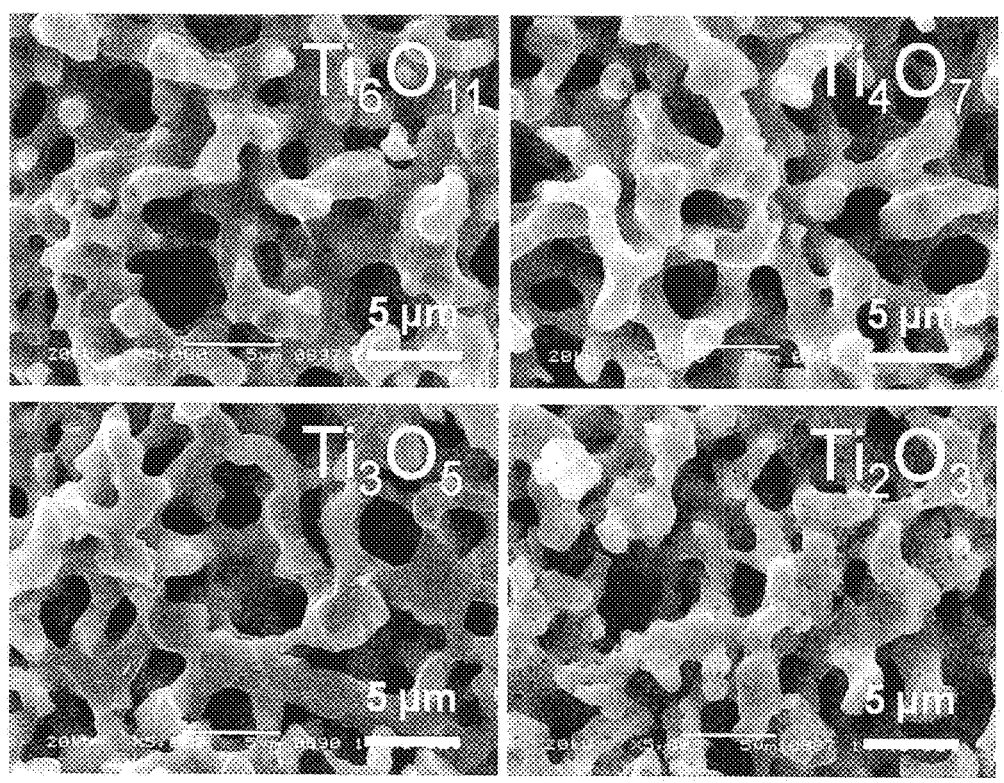
FIG. 4 shows images observed by a SEM for macroporous oxygen-deficient titanium oxide monoliths fabricated in an example.

Images of the thus-fabricated four monoliths observed by a SEM are shown in FIG. 4, results of pore distribution measurements by mercury intrusion are shown in FIG. 2, and XRD peaks of the materials composing the frameworks are shown in FIG. 3. In FIGS. 2 and 3, the results indicated by "$Ti_2O_3$" and the like are those for the oxygen-deficient monoliths fabricated in Example 1.

As shown in FIG. 3, the four monoliths obtained had frameworks respectively composed of four types of oxygen-deficient titanium oxide ($Ti_2O_3$, $Ti_3O_5$, $Ti_4O_7$, and $Ti_6O_{11}$). The diffraction peaks were sharp and were detected at approximately the same diffraction angles 2θ as theoretically localized, and no diffraction peaks attributed to other crystalline phases were not observed. This confirmed that each framework was composed of single-phase oxygen-deficient titanium oxide. The results shown in FIGS. 2 and 4 confirmed that each of the four monoliths obtained was a macroporous monolith having a co-continuous structure of the framework and macropores, and that each monolith retained the structural properties, such as the high uniformity of the diameters of the macropores, of the monolith A which was a precursor.

Figure 5:
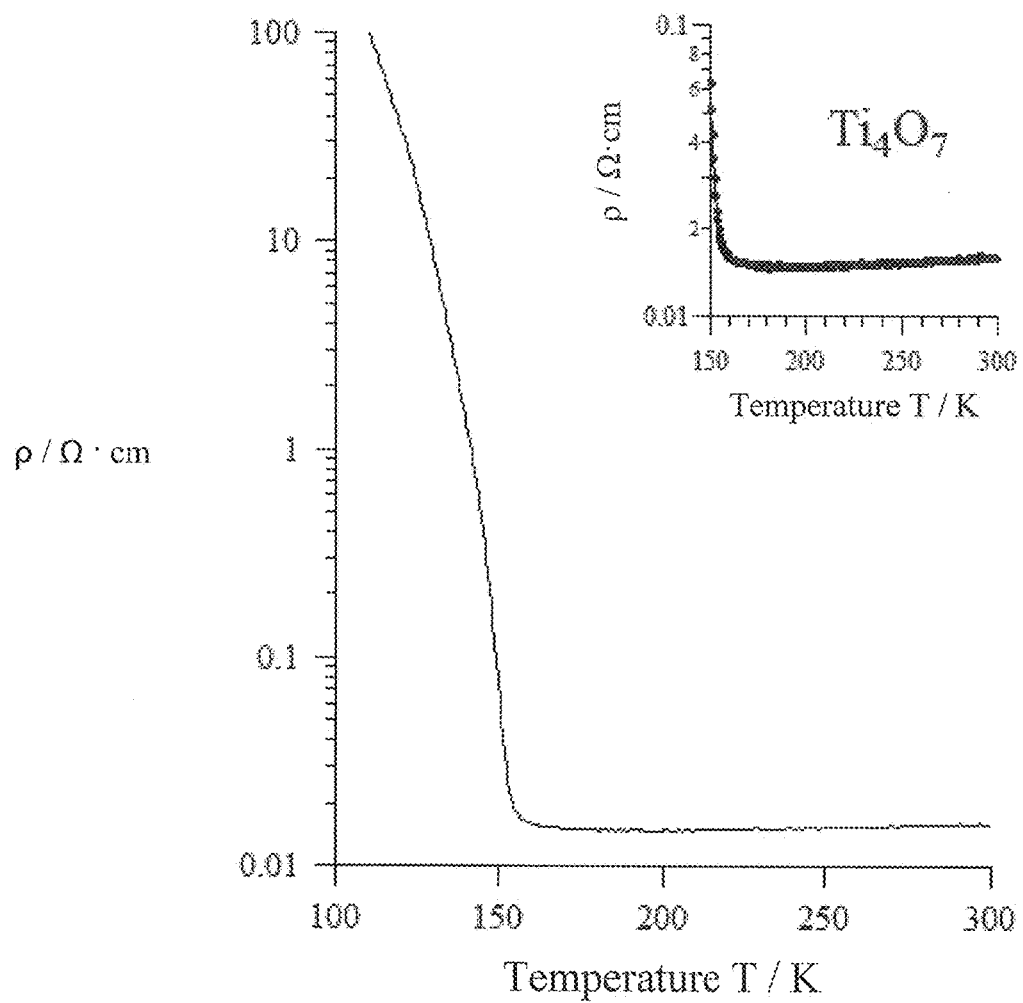
FIG. 5 shows a result of evaluation of the temperature-dependency of the electrical resistivity for a macroporous oxygen-deficient titanium oxide ($Ti_4O_7$) monolith fabricated in an example.

Next, among the four monoliths fabricated, the oxygen-deficient monolith having a framework composed of $Ti_4O_7$ ($Ti_4O_7$ monolith) was evaluated for the temperature dependency of the electrical resistivity ρ (Ω·cm). The evaluation result is shown in FIG. 5. As shown in FIG. 5, the monolith had a very low electrical resistivity of $1.5 \times 10^{-2}$ Ω·cm at room temperature, then expressed a metallic behavior in which the electrical resistivity decreases with temperature decrease from room temperature, and subsequently underwent a metal-semiconductor transition at about 150 K as conventionally reported for single-phase $Ti_4O_7$. This confirmed that the $Ti_4O_7$ monolith fabricated had a framework composed of single-phase $Ti_4O_7$. In FIG. 5, one graph shown in the upper right side is a partially-enlarged view of the other larger graph. The electrical resistivity ρ of the monolith was measured as follows: a fraction of the obtained monolith was cut, the cut fraction was molded into a rectangular parallelepiped having a size of several-mm square, and then the electrical resistivity of the molded monolith fraction was measured by a four-terminal method using Physical Property Measurement System manufactured by Quantum Design, Inc.

Figure 6:
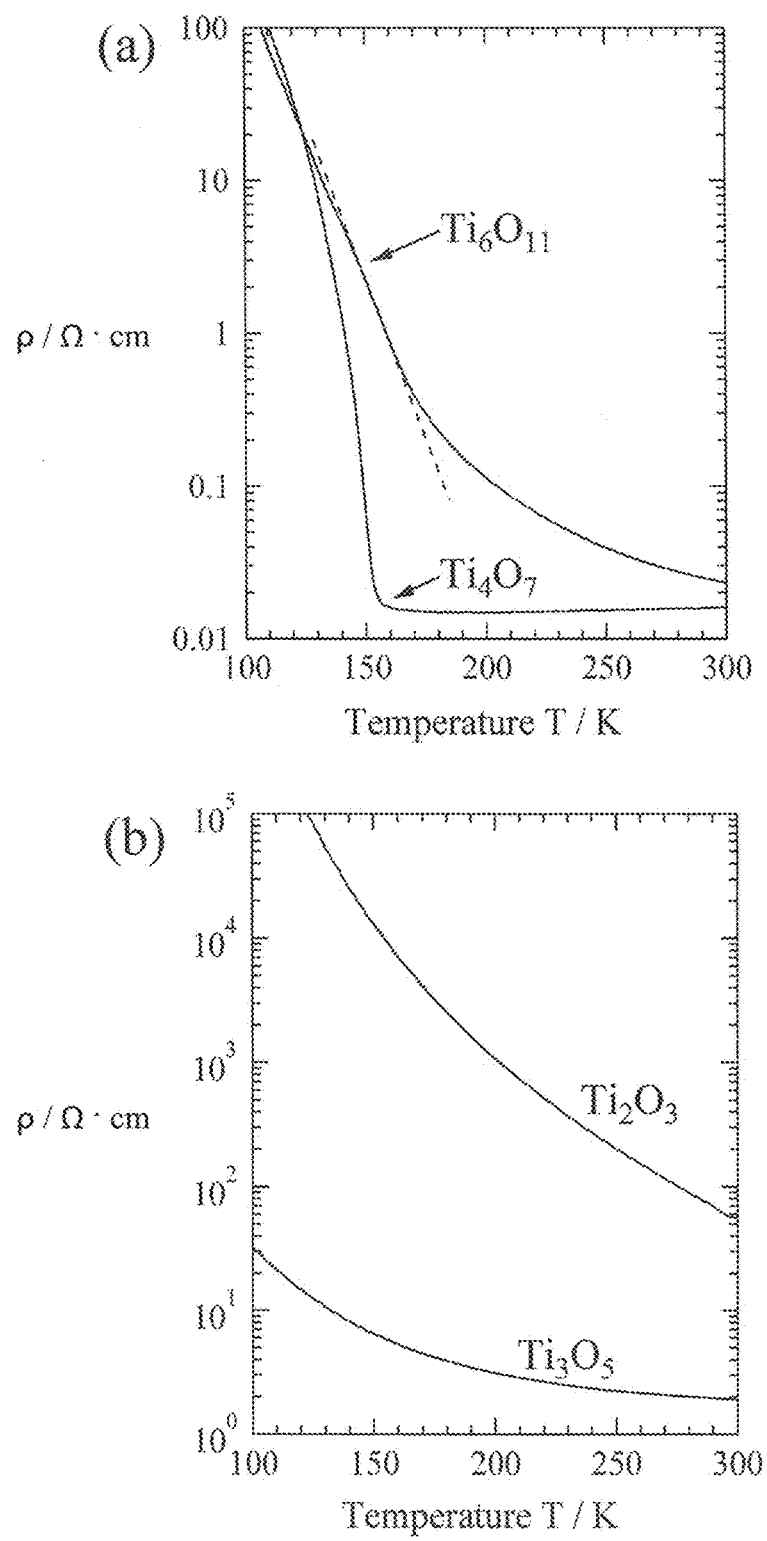
FIG. 6 shows results of evaluation of the temperature-dependency of the electrical resistivity for macroporous oxygen-deficient titanium oxide monoliths fabricated in an example.

The temperature dependencies of the electrical resistivity ρ that were measured for the other three monoliths in the same manner as above are shown in FIGS. 6(a) and 6(b) together with the temperature dependency of the electrical resistivity ρ in the $Ti_4O_7$ monolith. As shown in FIGS. 6(a) and 6(b), the electrical resistivity ρ at around ordinary temperature (300 K) was $5.6×10^1$ Ω·cm for the $Ti_2O_3$ monolith, 1.9×100 Ω·cm for the $Ti_3O_5$ monolith, and $2.3×10^{-2}$ Ω·cm for the $Ti_6O_{11}$ monolith.

In addition, the four monoliths fabricated were evaluated for their metal-semiconductor transition temperatures using a superconducting quantum interference device (SQUID) manufactured by Quantum Design, Inc (measured with a magnetic property measurement system (MPMS)). As a result, it was confirmed that the metal-semiconductor transition occurred at around 130 K for the $Ti_6O_{11}$ monolith, at around 150 K for the $Ti_4O_7$ monolith, at around 450 K for the $Ti_3O_5$ monolith, and at around 400 to 600 K for the $Ti_2O_3$ monolith. These transition temperatures were approximately the same as the transition temperatures conventionally reported for each type of single-phase oxygen-deficient titanium oxide. This confirmed that each oxygen-deficient monolith had a framework composed of single-phase oxygen-deficient titanium oxide.

Example 2

Figure 7A:
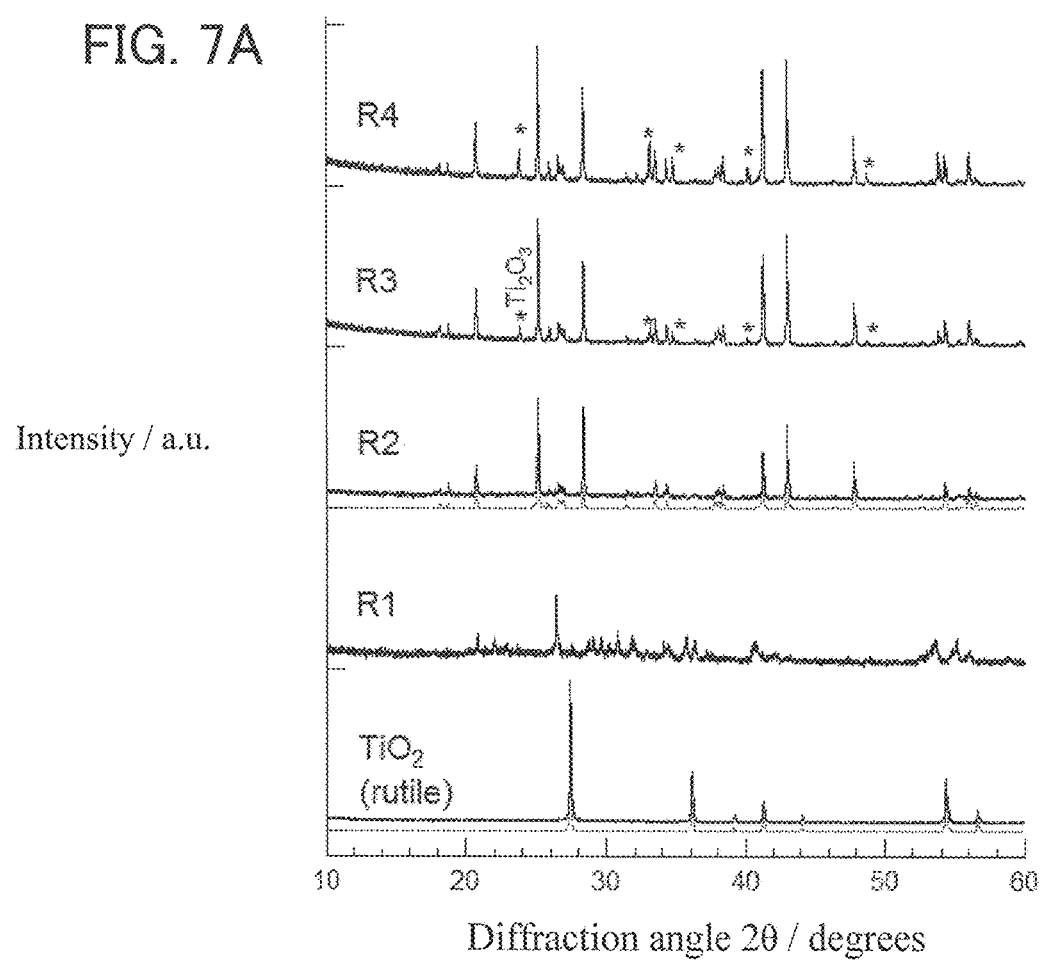
FIG. 7A shows diffraction peaks observed in XRD measurements on macroporous oxygen-deficient titanium oxide monoliths and a macroporous (rutile-type) titanium dioxide which were fabricated in an example.

A dioxide monolith B was obtained according to the precursor monolith fabrication method described above, except that the sintering temperature for the dry gel was 800° C. This dioxide monolith B was subjected to SEM observation, pore distribution measurement by mercury intrusion, and evaluation of XRD peaks of the material composing the framework. The XRD peaks of the material composing the framework of the dioxide monolith B are shown in FIG. 7A. In FIG. 7A, the result indicated by "$TiO_2$" is that for the dioxide monolith B. In FIG. 7A, the lower dashed line of the two dashed lines represents the theoretical diffraction peaks of rutile-type $TiO_2$, while the solid lines represent the diffraction peaks actually measured for the dioxide monolith B and oxygen-deficient monoliths obtained by gas-phase reduction of the monolith B. These evaluation results confirmed that the dioxide monolith B was a macroporous monolith having a co-continuous structure of macropores and a framework composed of rutile-type titanium dioxide, and that the diameters of the macropores were highly uniform in the dioxide monolith B as in the dioxide monolith A.

Next, oxygen-deficient monoliths were fabricated from the dioxide monolith B fabricated as described above. Specifically, as in Example 1, four samples R1 to R4 differing in the amount of the zirconium foil (the amounts of the zirconium foil in the samples were the same as those in Example 1) were prepared for the purpose of forming frameworks composed of four types of oxygen-deficient titanium oxide ($Ti_2O_3$, $Ti_3O_5$, $Ti_4O_7$, and $Ti_6O_{11}$), and were subjected to gas-phase reduction using a quartz tube. R1, R2, R3, and R4 were samples that were respectively intended to form $Ti_6O_{11}$, $Ti_4O_7$, $Ti_3O_5$, and $Ti_2O_3$ frameworks.

The four monoliths thus fabricated were subjected to SEM observation and pore distribution measurements by mercury intrusion. As a result, it was confirmed that each of these monoliths was a macroporous monolith having a co-continuous structure of the framework and macropores, and that each monolith retained the structural properties, such as the high uniformity of the diameters of the macropores, of the dioxide monolith B which was a precursor.

The XRD peaks of the materials composing the frameworks of the four monoliths fabricated as described above are shown in FIG. 7A. In FIG. 7A, the results indicated by "R1" and the like are those for the oxygen-deficient monoliths fabricated in Example 2.

Figure 7B:
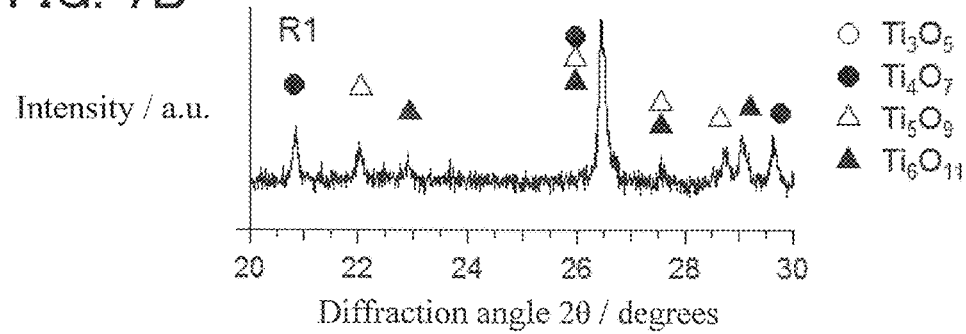
FIG. 7B is an enlarged view of a diffraction angle $2\theta$ range from 20 degrees to 30 degrees in the diffraction peak profile of R1 shown in FIG. 7A.

As shown in FIG. 7A, it was confirmed that each of the four monoliths obtained had a framework composed not of single-phase oxygen-deficient titanium oxide but of two or more types of oxygen-deficient titanium oxide. The "asterisks" in the diffraction profiles of R3 and R4 represent diffraction peaks derived from $Ti_2O_3$. That is, although R3 and R4 were samples that were respectively intended to form a $Ti_3O_5$ framework and a $Ti_2O_3$ framework, diffraction peaks of $Ti_2O_3$ and $Ti_3O_5$ were detected for both R3 and R4 (theoretical diffraction peaks of $Ti_3O_5$ are shown by a dashed line for R2). Although R2 was a sample intended to form a $Ti_4O_7$ framework, only slight $Ti_4O_7$ was formed, and the diffraction peaks of $Ti_3O_5$ were predominantly observed. Although R1 was a sample intended to form a $Ti_6O_{11}$ framework, the monolith obtained from R1 had a framework composed of four types of oxygen-deficient titanium oxide as shown in FIG. 7B which is an enlarged view of the diffraction angle 2θ range from 20 to 30 degrees.

Example 3: Fabrication of Oxynitride Monolith

An oxynitride monolith was fabricated from the dioxide monolith A fabricated as described above. Specifically, the oxynitride monolith was fabricated by the procedures described below.

The dioxide monolith A and a zirconium nitride powder (with an average particle diameter of 100 μm) were placed in a quartz tube, and the quartz tube was tightly closed. The amount of the zirconium nitride powder confined in the quartz tube was 50 parts by weight per 100 parts by weight of titanium dioxide. Next, a vacuum with a pressure of $4×10^{-2}$ Pa was created within the quartz tube, which was sealed so that gases could not enter or exit the quartz tube any more. Next, the entire tube was put into an electric furnace maintained at 1150° C., followed by heating treatment for 24 hours. After the heating treatment, the quartz tube was taken out from the electric furnace, was cooled to room temperature at a temperature decrease rate of 100° C. per hour, and was then unsealed to take out the monolith from the inside of the quartz tube. The color of the monolith A before the heating treatment was white, whereas the color of the monolith after the heating treatment was black.

Figure 8:
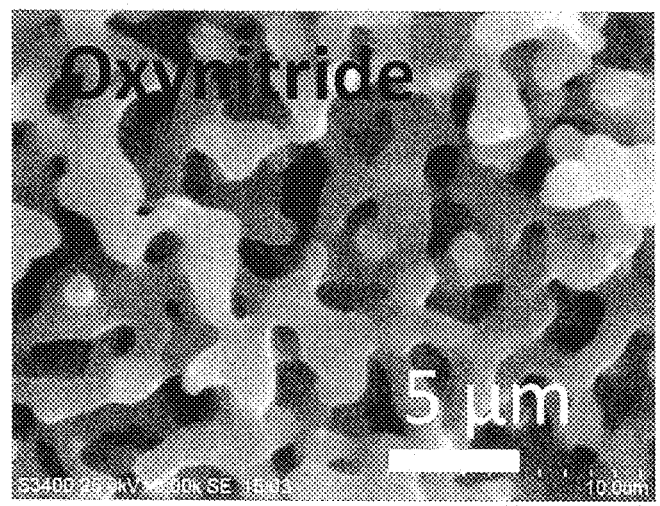
FIG. 8 shows an image observed by a SEM for a macroporous titanium oxynitride monolith fabricated in an example.
Figure 9:
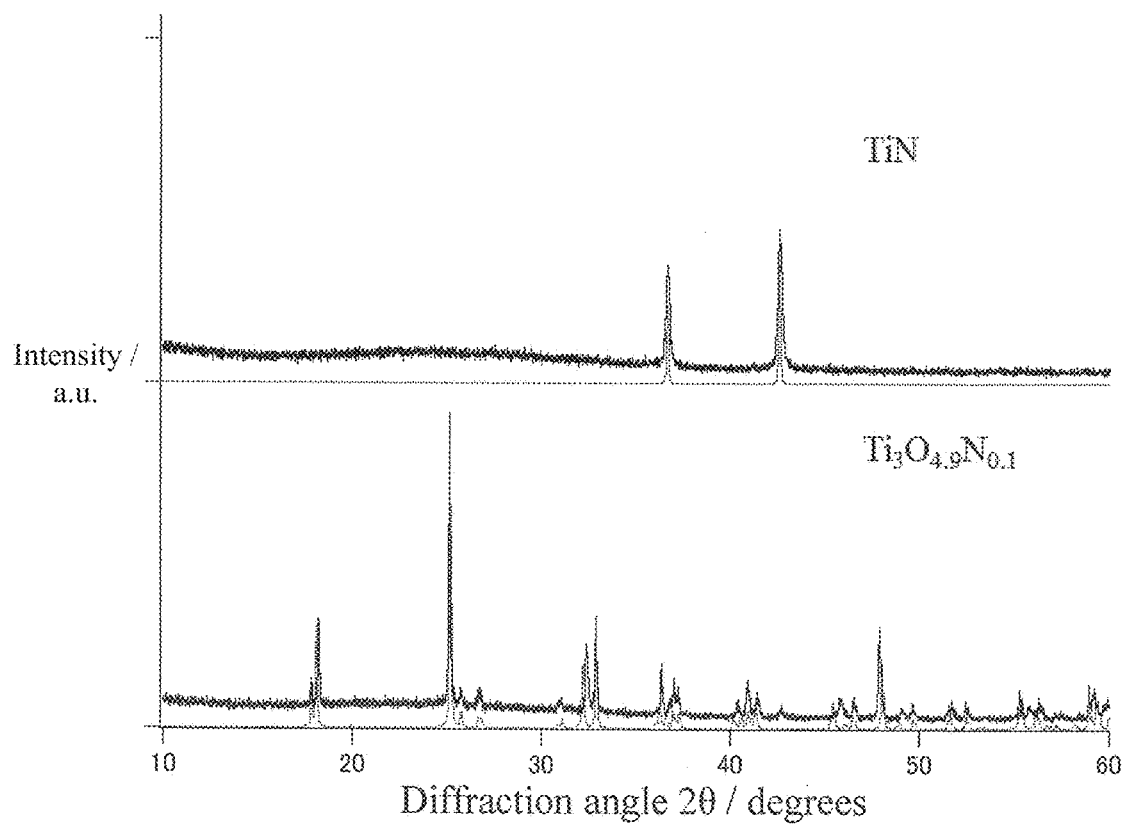
FIG. 9 shows diffraction peaks observed in XRD measurements on a macroporous titanium oxynitride monolith fabricated in an example and a macroporous titanium nitride monolith fabricated in another example.

An image of the thus-fabricated monolith observed by a SEM is shown in FIG. 8, and XRD peaks of the material composing the framework are shown in FIG. 9. In FIG. 9, the result indicated by "$Ti_3O_{4.9}N_{0.1}$" is that for the oxynitride monolith fabricated in Example 3.

As shown in FIG. 9, the obtained monolith had a framework composed of titanium oxynitride ($Ti_3O_{4.9}N_{0.1}$). The crystalline diffraction peaks were sharp and were detected at approximately the same diffraction angles 2θ as theoretically localized (shown by a dashed line in FIG. 9), and no diffraction peaks attributed to other crystalline phases were not observed. This confirmed that the framework was composed of single-phase $Ti_3O_{4.9}N_{0.1}$. The result shown in FIG. 8 confirmed that the obtained monolith was a porous monolith having a co-continuous structure of the framework and macropores. Based on the state of the framework and macropores shown in FIG. 8 and considering the results of Example 1, it was inferred that the obtained monolith retained the structural properties, such as the high uniformity of the diameters of the macropores, of the dioxide monolith A which was a precursor.

Example 4: Fabrication of Nitride Monolith

A nitride monolith was fabricated from the dioxide monolith A fabricated as described above. Specifically, the nitride monolith was fabricated by the procedures described below.

The dioxide monolith A was placed in a quartz tube that had an internal volume of $4.5 \times 10^5$ mL and to which was connected a duct for flowing ammonia into the quartz tube. Next, the entire tube was put into an electric furnace maintained at 1000° C., and heat treatment was performed for 24 hours while ammonia was flowed into the quartz tube at a flow rate of 200 mL/minute. After the heat treatment, the quartz tube was taken out from the electric furnace, and was cooled to room temperature at a temperature decrease rate of 100° C. per hour. Thereafter, the monolith was taken out from the inside of the quartz tube. The color of the monolith A before the heat treatment was white, whereas the color of the monolith after the heat treatment was dark brown.

Figure 10:
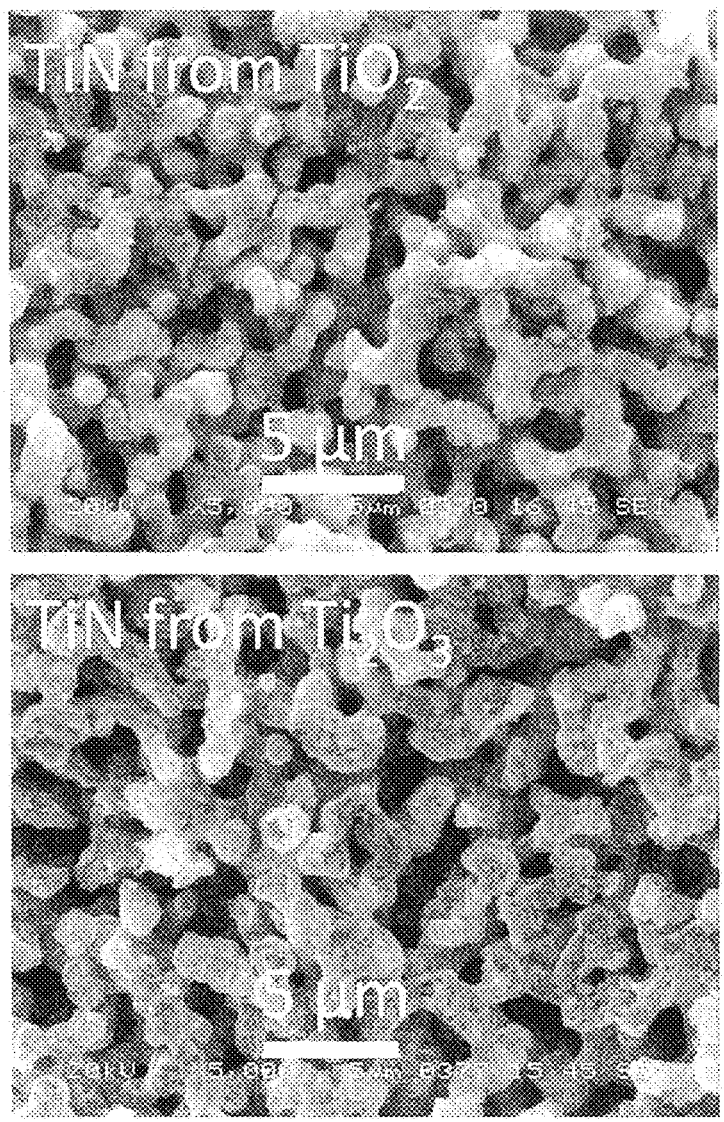
FIG. 10 shows images observed by a SEM for macroporous titanium nitride monoliths fabricated in an example.

An image of the thus-fabricated monolith observed by a SEM is shown in FIG. 10, and XRD peaks of the material composing the framework are shown in FIG. 9. In FIG. 9, the result indicated by "TiN" is that for the nitride monolith fabricated in Example 4.

As shown in FIG. 9, the obtained monolith had a framework composed of titanium nitride (TiN). The crystalline diffraction peaks were sharp and were detected at approximately the same diffraction angles 2θ as theoretically localized (shown by a dashed line in FIG. 9), and no diffraction peaks attributed to other crystalline phases were not observed. This confirmed that the framework was composed of single-phase TiN. The result shown in FIG. 10 confirmed that the obtained monolith was a porous monolith having a co-continuous structure of the framework and macropores. Based on the state of the framework and macropores shown in FIG. 10 and considering the results of Example 1, it was inferred that the obtained monolith retained the structural properties, such as the high uniformity of the diameters of the macropores, of the dioxide monolith A which was a precursor.

In addition, the same heat treatment (gas-phase reduction) by ammonia was performed using the $Ti_2O_3$ monolith fabricated in Example 1 instead of the dioxide monolith A. As a result, a TiN monolith similar to that obtained in the case of using the dioxide monolith A was obtained as shown in FIG. 10.

Example 5: Fabrication of Oxygen-Deficient Monolith in which Carbon Particles are Placed An oxygen-deficient monolith in which carbon particles were placed within the framework and on the surface of the framework was fabricated from a dioxide monolith in which carbon particles were placed within the framework and on the surface of the framework. Specifically, the oxygen-deficient monolith was fabricated by the procedures described below.

Figure 11:
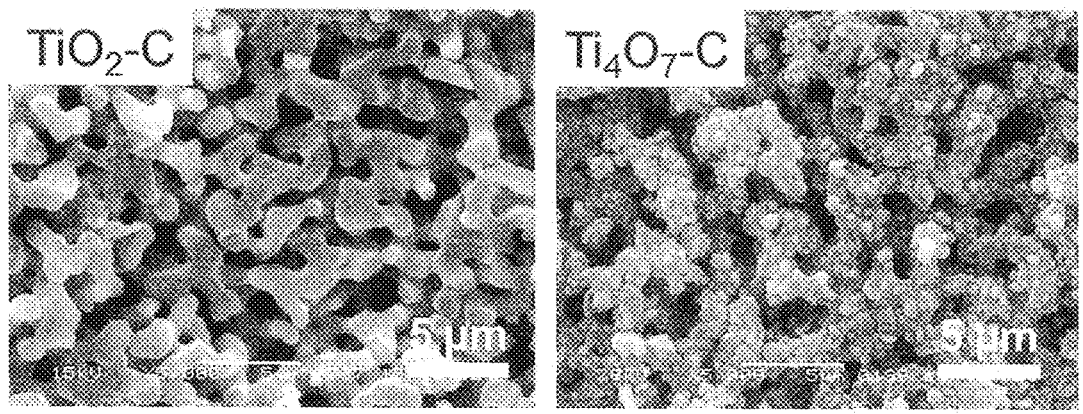
FIG. 11 shows images observed by a SEM for a macroporous titanium dioxide monolith and a macroporous oxygen-deficient titanium oxide monolith which were fabricated in an example and in which carbon particles were placed.
Figure 12:
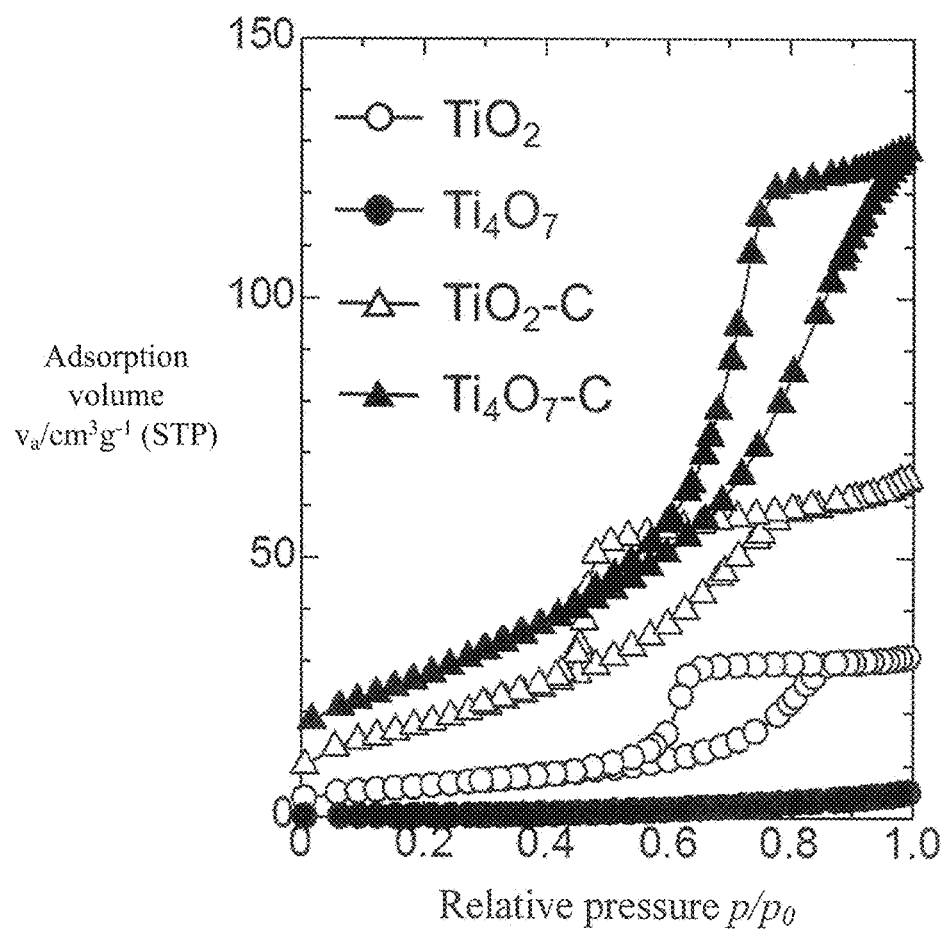
FIG. 12 shows results of pore distribution measurements by nitrogen adsorption-desorption on macroporous titanium dioxide monoliths and macroporous oxygen-deficient titanium oxide monoliths which were fabricated in examples.
Figure 13:
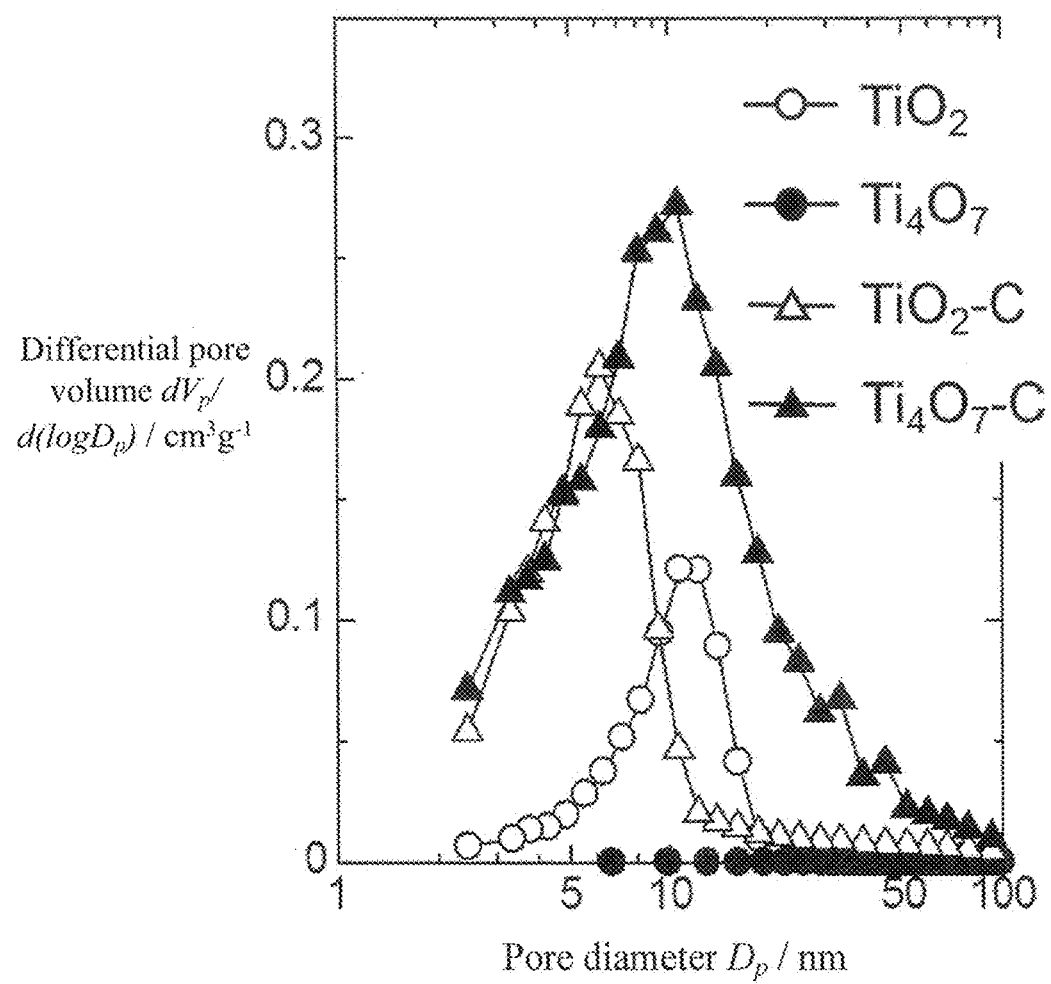
FIG. 13 shows results of pore distribution measurements by nitrogen adsorption-desorption on macroporous titanium dioxide monoliths and macroporous oxygen-deficient titanium oxide monoliths which were fabricated in examples.

A wet gel was obtained according to the fabrication method of the dioxide monolith A. As in the fabrication of the dioxide monolith A, the obtained gel was subjected to solvent replacement and left in 60° C. water for 24 hours. Thereafter, the gel was immersed in an aqueous solution (with a concentration of 10 weight %) of poly(acrylic acid) as a precursor of carbon particles, followed by drying at 40° C. for 48 hours to obtain a dry gel. Next, the obtained dry gel was sintered under a nitrogen flow (flow rate=1 L/minute) at 600° C. for 2 hours to obtain a dioxide monolith C that had a framework composed of titanium dioxide and in which carbon particles were placed within the framework and on the surface of the framework. An image of the obtained dioxide monolith C observed by a SEM is shown in FIG. 11, results of nitrogen adsorption-desorption isotherm measurements by a nitrogen adsorption-desorption measurement method are shown in FIG. 12, and results of pore distribution measurements by the same measurement method are shown in FIG. 13. In FIGS. 11 to 13, the results indicated by "$TiO_2$—C" are those for the dioxide monolith C. In FIGS. 12 and 13, the results indicated by "$TiO_2$" are those for the dioxide monolith A. The nitrogen adsorption-desorption measurements in Example 5 were performed using a nitrogen adsorption-desorption measuring apparatus (BELSORP-mini II manufactured by BEL JAPAN, INC.).

The result shown in FIG. 11 confirmed that, similarly to the dioxide monolith A, the dioxide monolith C was a macroporous monolith having a co-continuous structure of macropores and a framework composed of titanium dioxide. The results shown in FIGS. 12 and 13 confirmed that the volume of micropores and mesopores in the dioxide monolith C were increased compared with those in the dioxide monolith A. The increase of micropores is confirmed by the fact that, in the graph shown in FIG. 12, the adsorption volume $V_a$ is increased in a region where the relative pressure $p/p_0$ is small. These increases are inferred to result from the carbon particles; thus, it was confirmed that the carbon particles were placed within the dioxide monolith C. More specifically, the increase in the volume of micropores is inferred to be due to the pores that the carbon particles themselves had. For the mesopores, it is inferred that the placement of the carbon particles within the framework caused physical obstruction that led to change in the size of the crystal grains of the titanium compound and thus to an increase in the volume of mesopores corresponding to voids between the crystal grains. Also when poly(vinylpyrrolidone) was used as a precursor instead of poly(acrylic acid), a similar dioxide monolith C was able to be fabricated.

Next, an oxygen-deficient monolith whose framework was composed of $Ti_4O_7$ and in which carbon particles were placed within the framework and on the surface of the framework was fabricated from the dioxide monolith C fabricated as described above. Specifically, the oxygen-deficient monolith was fabricated by the procedures described below.

The dioxide monolith C and a zirconium foil (with an average thickness of 100 μm) were placed in a quartz tube, and the quartz tube was tightly closed. The amount of the zirconium foil placed in the quartz tube was adjusted to be 10 weight % greater than the stoichiometric amount necessary to reduce and convert the titanium dioxide composing the dioxide monolith framework into $Ti_4O_7$. Next, a vacuum with a pressure of $4 \times 10^{-2}$ Pa was created within the quartz tube, which was sealed so that gases could not enter or exit the quartz tube any more. Next, the entire tube was put into an electric furnace, and the temperature of the furnace was increased at a temperature increase rate of 100° C. per hour; thus, heating treatment was performed at 1050° C. for 24 hours. After the heating treatment, the inside of the furnace was cooled to room temperature at a temperature decrease rate of 100° C. per hour, and then the quartz tube was taken out from the electric furnace. After the quartz tube was naturally cooled, the quartz tube was unsealed, and the monolith was taken out from the inside of the quartz tube.

An image of the thus-fabricated $Ti_4O_7$ monolith observed by a SEM is shown in FIG. 11, nitrogen adsorption-desorption isotherms measured by a nitrogen adsorption-desorption measurement method are shown in FIG. 12, and results of pore distribution measurements by the nitrogen adsorption-desorption measurement method are shown in FIG. 13. In FIGS. 11 to 13, the results indicated by "$Ti_4O_7$—C" are those for the $Ti_4O_7$ monolith fabricated from the dioxide monolith C. In FIGS. 12 and 13, the results indicated by "$Ti_4O_7$" are those for the $Ti_4O_7$ monolith fabricated in Example 1. By the same XRD measurement as that in Example 1, it was separately confirmed that the framework of the oxygen-deficient monolith fabricated in Example 5 was composed of $Ti_4O_7$.

As shown in FIG. 11, it was confirmed that the obtained $Ti_4O_7$ monolith was a macroporous monolith having a co-continuous structure of the framework and macropores, and that the $Ti_4O_7$ monolith retained the structural properties, such as the high uniformity of the diameters of the macropores, of the monolith C which was a precursor. In FIG. 11, minute irregularities are observed on the framework surface of the $Ti_4O_7$ monolith. This was inferred to result from the fact that the growth of the $Ti_4O_7$ crystal was physically inhibited by the presence of the carbon particles, and the crystal grains adjacent to each other were not combined together but became individually observable on the framework surface. As shown in FIGS. 12 and 13, mesopores were hardly observed in the $Ti_4O_7$ monolith fabricated in Example 1, whereas in the $Ti_4O_7$ monolith fabricated in Example 5, pores having diameters corresponding to those of mesopores were observed. The specific surface area of the $Ti_4O_7$ monolith of Example 5 measured by a BET method was 98 $m^2$ $g^{-1}$. The pores observed are thought to have been formed by the placement of the carbon particles.

Figure 14:
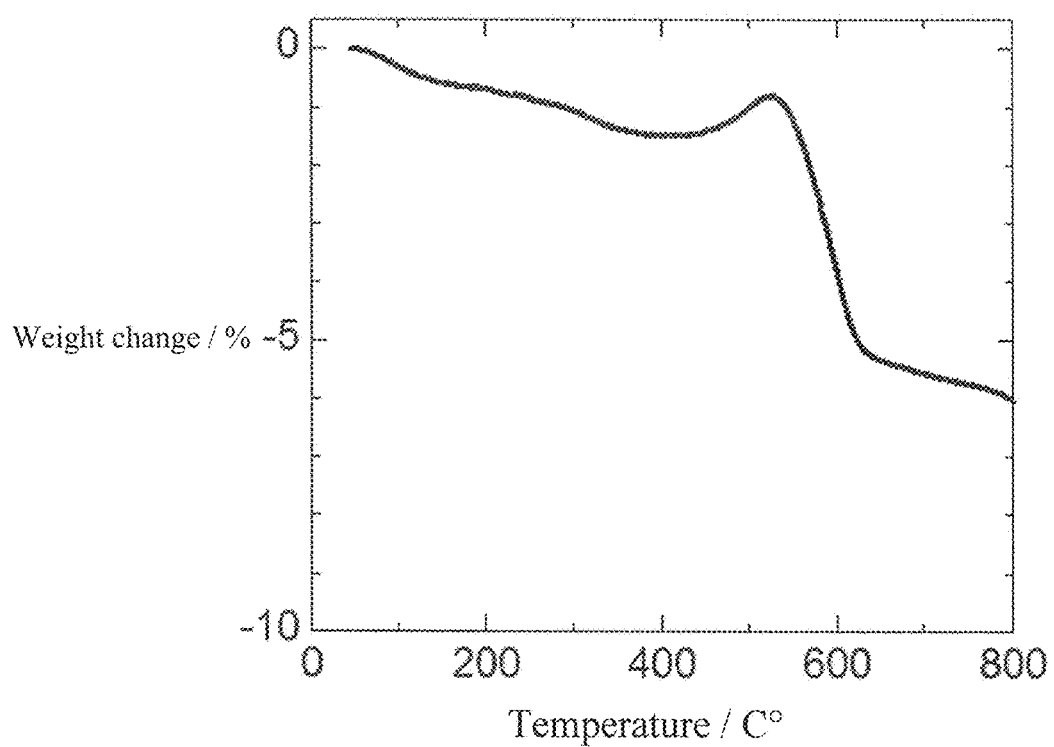
FIG. 14 shows a result of evaluation by thermogravimetry (TG) on a macroporous oxygen-deficient titanium oxide monolith which was fabricated in an example and in which carbon particles were placed.

In FIG. 14 is shown a result of thermogravimetric (TG) measurement on the fabricated $Ti_4O_7$ monolith in which carbon particles were placed. The monolith to be measured was pulverized with a mortar to obtain a sample (with a weight of 1.86 mg), and the TG measurement was performed on the sample using a differential thermogravimetric analyzer (Thermo Plus EVO TG8120 manufactured by Rigaku Corporation) under the following condition: air flow rate=100 mL/minute and temperature increase rate=5° C./minute. For the TG curve shown in FIG. 14, it is thought that the weight decrease in the temperature region up to 100° C. is attributed to evaporation of water adsorbed on the monolith, the weight decrease in the temperature region from 100° C. to 400° C. is attributed to the thermal decomposition (combustion) of organic substances remaining in the monolith, the weight increase in the temperature region from 400° C. to 520° C. is attributed to oxidation of $Ti_4O_7$ composing the monolith framework into $TiO_2$, and the weight decrease in the temperature region above 520° C. is attributed to the combustion of the carbon particles in the monolith. The amount of the carbon particles in the monolith as estimated from this TG curve was about 9 weight % of the total weight of the monolith.

Figure 15:
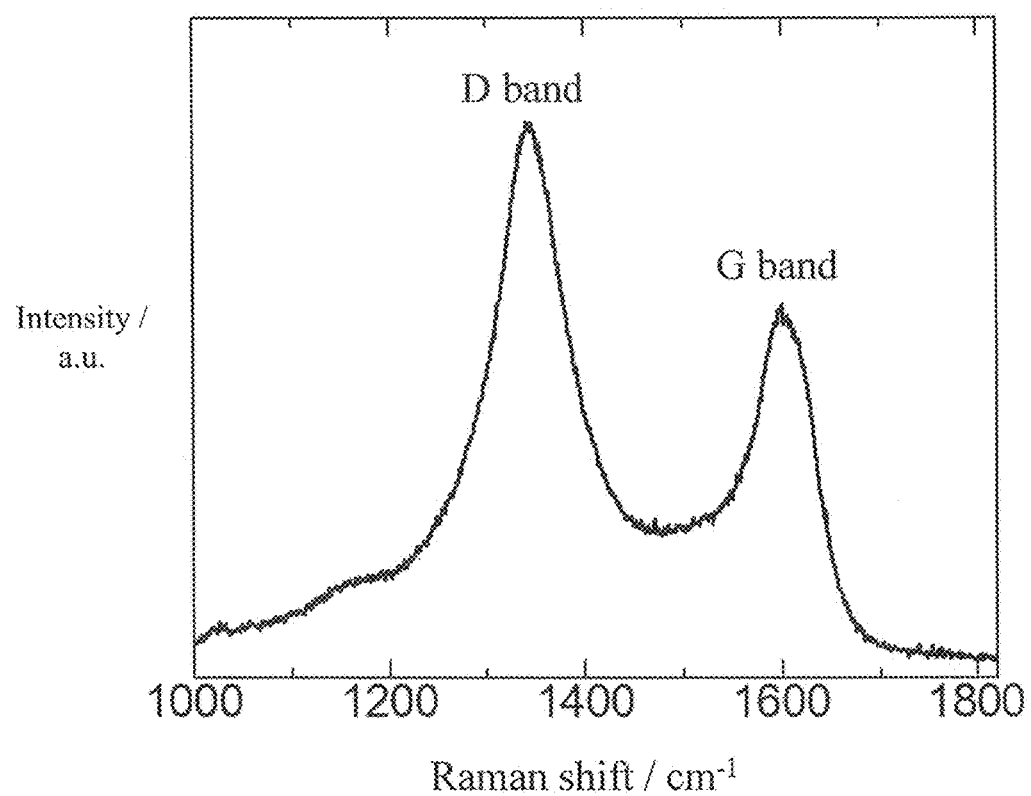
FIG. 15 shows a result of evaluation by Raman spectroscopy on a macroporous oxygen-deficient titanium oxide monolith which was fabricated in an example and in which carbon particles were placed.

In FIG. 15 is shown a result of Raman spectroscopy on the fabricated $Ti_4O_7$ monolith in which carbon particles were placed. The Raman spectroscopy was performed using a Raman microscope (XploRA manufactured by HORIBA, Ltd.) under the following condition: laser wavelength=532 nm, filter=1%, grid=2400T, exposure time=2 seconds, and number of scans=20. As shown in FIG. 15, D band of carbon (spa carbon) was detected at around a wavenumber of 1340 $cm^{-1}$, and G band of carbon ($sp^2$ carbon) was detected at around a wavenumber of 1600 $cm^{-1}$, which confirmed the presence of carbon particles placed in the $Ti_4O_7$ monolith.

Example 6

In Example 6, considering the use of a macroporous monolith as an electrode, the electrochemical stability of the monolith and a specific application of the monolith as an electrode were examined. In Example 6, the electrochemical properties of the electrode composed of the macroporous monolith (this electrode will be referred to as a monolith electrode hereinafter) were evaluated using a potentiostat/galvanostat (HSV-110 manufactured by HOKUTO DENKO CORPORATION) and a three-electrode cell.

Figure 16:
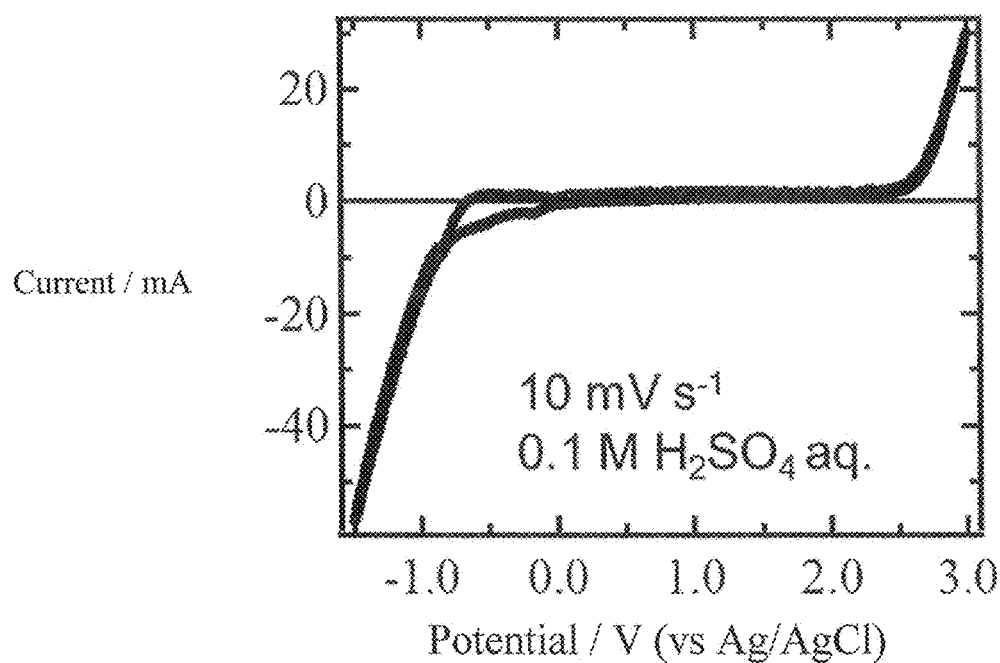
FIG. 16 shows a result of evaluation by cyclic voltammetry (CV) on a macroporous oxygen-deficient titanium oxide monolith fabricated in an example.
Figure 17:
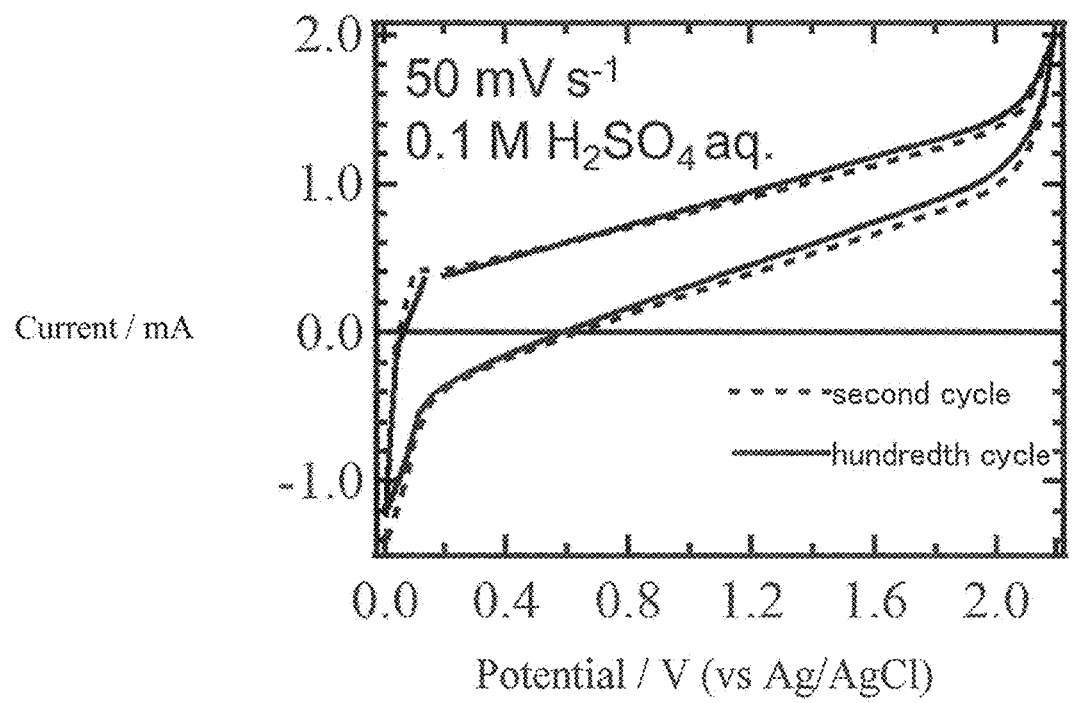
FIG. 17 shows results of evaluation by CV on a macroporous oxygen-deficient titanium oxide monolith fabricated in an example.

The $Ti_4O_7$ monolith fabricated in Example 1 was prepared as an evaluation sample. The cyclic voltammograms (CV) of the monolith electrode in a sulfuric acid electrolyte solution (with a concentration of 0.1 mol/L) are shown in FIGS. 16 and 17. The evaluation by CV was carried out by disposing the $Ti_4O_7$ monolith electrode as a working electrode, using a platinum wire as a counter electrode, and using a Ag/AgCl reference electrode (manufactured by ALS Co., Ltd.) as a reference electrode. As shown in FIG. 16, the $Ti_4O_7$ monolith electrode exhibited a high hydrogen overvoltage and a high oxygen overvoltage, and was confirmed to have a wide potential window in the sulfuric acid electrolyte solution. FIG. 17 shows CV curves measured in the second cycle and the hundredth cycle with the cut off potential range set from 0 V and 2.2 V. As shown in FIG. 17, there was almost no change in current value between the second cycle and the hundredth cycle, which confirmed that the $Ti_4O_7$ monolith electrode had excellent stability.

Figure 18:
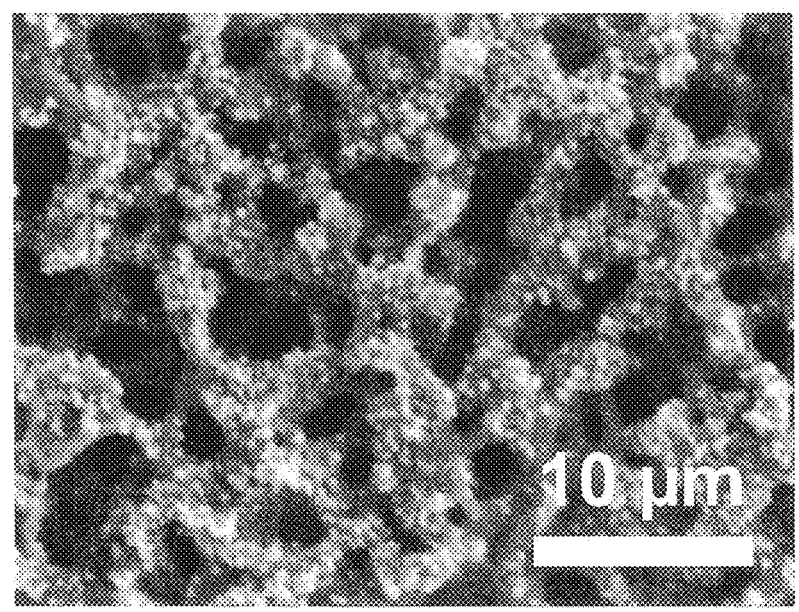
FIG. 18 shows an image observed by a SEM for a macroporous oxygen-deficient titanium oxide monolith which was fabricated in an example and in which platinum particles were placed.

Next, an application of the $Ti_4O_7$ monolith as an electrode was examined with platinum catalyst particles supported on the monolith. The platinum catalyst was supported onto the monolith electrode by electrolytic plating. Specifically, an aqueous chloroplatinic acid solution with a concentration of 0.5 mmol/L was prepared, and this solution was placed in a three-electrode cell, after which the $Ti_4O_7$ monolith fabricated in Example 1, a platinum wire, and a Ag/AgCl reference electrode (manufactured by ALS Co., Ltd.) were disposed, respectively, as a working electrode of the cell, as a counter electrode, and as a reference electrode. Next, the cell was allowed to keep a constant potential of −0.5 V for 10 minutes. A SEM image of the monolith electrode having been subjected to the electrolytic plating is shown in FIG. 18. As shown in FIG. 18, it was confirmed that innumerable platinum particles having diameters of about several hundred nanometers were supported on the surface of the monolith framework.

(Application 1: Electrolysis of Water)

Figure 19:
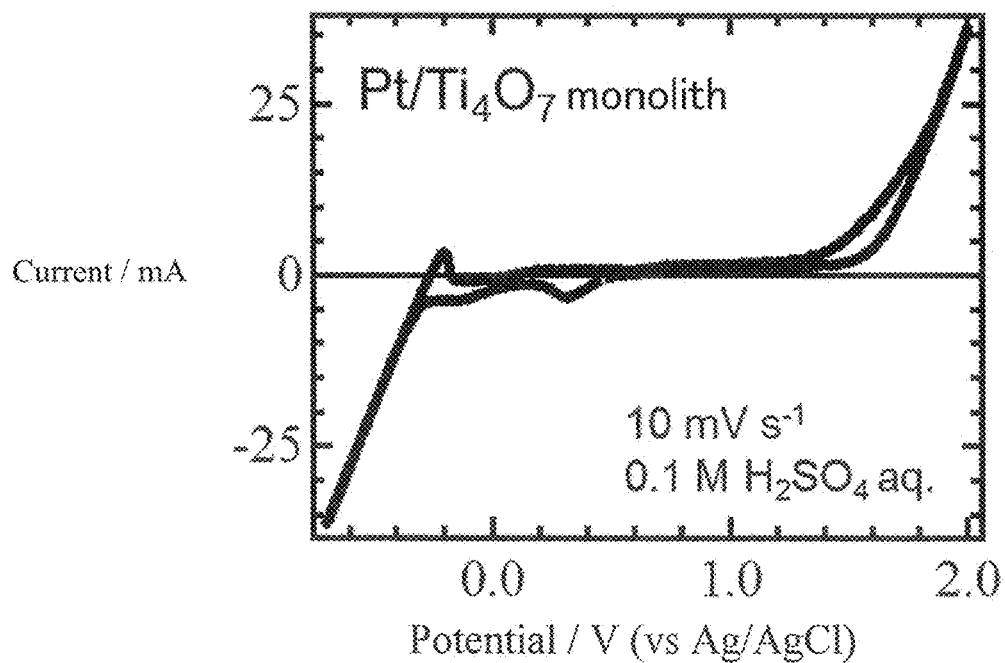
FIG. 19 shows a result of evaluation by linear sweep voltammetry (LSV) on a macroporous oxygen-deficient titanium oxide monolith which was fabricated in an example and in which platinum particles were placed.

In FIG. 19 are shown CV curves measured for the platinum particle-supported $Ti_4O_7$ monolith electrode in a sulfuric acid electrolyte solution (with a concentration of 0.1 mol/L). The evaluation by CV was carried out in a three-electrode cell formed by disposing the platinum-supported monolith electrode as a working electrode, using a platinum wire as a counter electrode, and using a Ag/AgCl reference electrode (manufactured by ALS Co., Ltd.) as a reference electrode. The cut off potential range was set from −0.7 V to 2.0 V. As shown in FIG. 19, it was confirmed that, due to the catalytic action of the platinum particles supported on the monolith, a current attributed to generation of oxygen flowed at a potential of about 1.5 V or higher, and a current attributed to generation of hydrogen flowed at a potential of about −0.3 V or lower.

(Application 2: Oxidation of Methanol)

Figure 20:
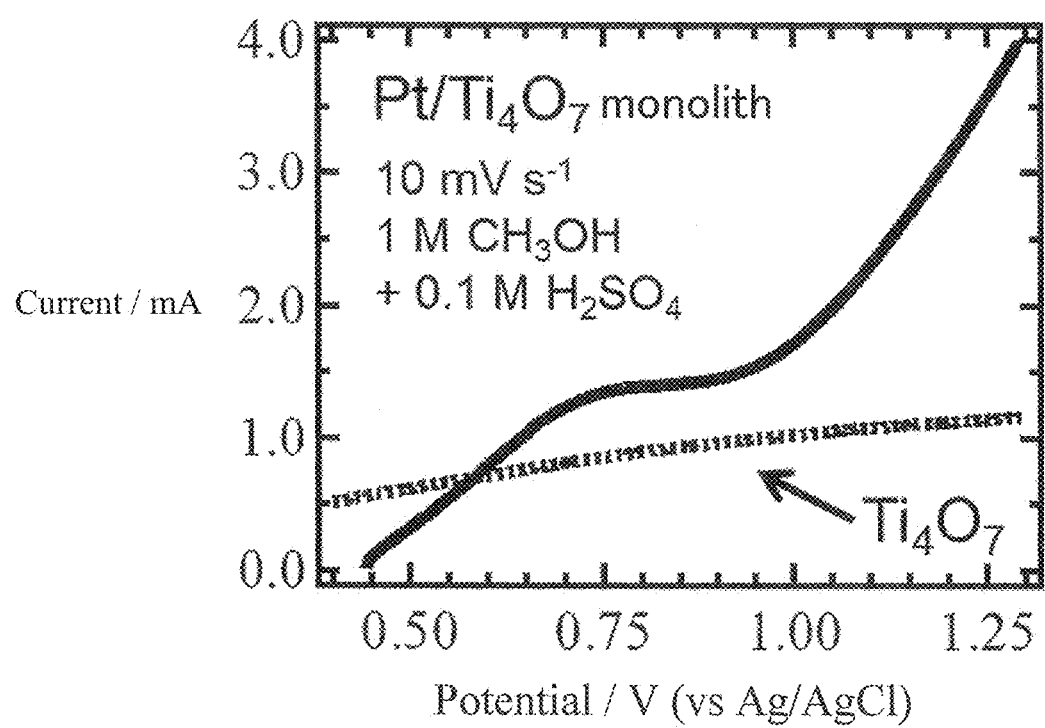
FIG. 20 shows a result of evaluation by LSV performed in the presence of methanol on a macroporous oxygen-deficient titanium oxide monolith which was fabricated in an example and in which platinum particles were placed.

In FIG. 20 is shown a linear sweep voltammetry (LSV) curve measured for the platinum-supported $Ti_4O_7$ monolith electrode in an aqueous solution of methanol and sulfuric acid (the methanol concentration=1.0 mol/L, the sulfuric acid concentration=0.1 mol/L) The evaluation by LSV was carried out in a three-electrode cell formed by disposing the platinum-supported monolith electrode as a working electrode, using a platinum wire as a counter electrode, and using a Ag/AgCl reference electrode (manufactured by ALS Co., Ltd.) as a reference electrode. The sweeping was performed from 0.40 V to 1.30 V. For comparison, a comparative experiment was also carried out in which the $Ti_4O_7$ monolith yet to have platinum supported thereon was used as a reference electrode. The evaluation results are shown in FIG. 20. In FIG. 20, the solid line represents a LSV curve for the platinum-supported monolith electrode, while the dotted line represents a LSV curve for the monolith electrode having no platinum particles supported thereon.

As shown in FIG. 20, a current attributed to oxidation of methanol was not clearly observed in the monolith electrode yet to have platinum supported thereon, whereas in the platinum-supported monolith electrode, an increase in current value attributed to oxidation of methanol was observed at a potential of 0.90 V or higher. Thus, it was confirmed that placement of a catalyst in the monolith allows the applications of the monolith to various uses such as use as a reactive electrode.

The present invention may be embodied in other forms without departing from the spirit or essential characteristics thereof. The embodiments disclosed in this specification are to be considered in all respects as illustrative and not limiting. The scope of the present invention is indicated by the appended claims rather than by the foregoing description, and all changes which come within the meaning and range of equivalency of the claims are intended to be embraced therein.

INDUSTRIAL APPLICABILITY

The macroporous titanium compound monolith formed by the production method of the present invention can be widely used, for example, in electrochemical devices such as battery electrodes and gas sensor electrodes, in catalysts such as photocatalysts, and in electronic devices.

The invention claimed is:

1. A macroporous titanium compound monolith having:
a co-continuous structure of a macropore, a framework of the co-continuous structure is composed of one selected from the group consisting of:
single-phase oxygen-deficient titanium oxide, the macroporous titanium compound monolith having electron conductivity derived from the oxygen-deficient titanium oxide;
titanium oxynitride, the macroporous titanium compound monolith having electron conductivity derived from the titanium oxynitride; and
titanium nitride, the macroporous titanium compound monolith having electron conductivity derived from the titanium nitride.

2. The macroporous titanium compound monolith according to claim 1, having an electrical resistivity of $10^3 \Omega \cdot cm$ or less, wherein the framework is composed of the single-phase oxygen-deficient titanium oxide.

3. The macroporous titanium compound monolith according to claim 1,
wherein the framework is composed of the single-phase oxygen-deficient titanium oxide, and
wherein carbon particles and/or metal particles are placed within the framework and/or on a surface of the framework.

4. The macroporous titanium compound monolith according to claim 1, being an electrode, wherein the framework is composed of the single-phase oxygen-deficient titanium oxide.

5. The macroporous titanium compound monolith according to claim 1, wherein the framework is composed of the titanium oxynitride.

6. The macroporous titanium compound monolith according to claim 1, wherein the framework is composed of the titanium nitride.

7. A method for producing a macroporous titanium compound monolith, comprising:
placing a macroporous titanium dioxide monolith and a metal having titanium-reducing ability in a container, the macroporous titanium dioxide monolith having a co-continuous structure of a macropore and a framework that is composed of titanium dioxide;
creating a vacuum atmosphere or an inert gas atmosphere within the container; and
heating the monolith and the metal to cause gas-phase reduction that removes oxygen atom from the titanium dioxide composing the monolith by the metal acting as an oxygen getter, thereby obtaining a macroporous oxygen-deficient titanium oxide monolith having a co-continuous structure of the macropore and a framework that is composed of oxygen-deficient titanium oxide, the macroporous oxygen-deficient titanium oxide monolith having electron conductivity derived from the oxygen-deficient titanium oxide.

8. The method for producing a macroporous titanium compound monolith according to claim 7, wherein the metal in the form of a foil is placed in the container.

9. The method for producing a macroporous titanium compound monolith according to claim 7, wherein the metal is at least one selected from zirconium (Zr) and hafnium (Hf).

10. The method for producing a macroporous titanium compound monolith according to claim 9, wherein the heating is performed at a temperature of 900 to 1300° C.

11. The method for producing a macroporous titanium compound monolith according to claim 7, wherein the titanium dioxide composing the framework of the macroporous titanium dioxide monolith is of anatase type.

12. A method for producing a macroporous titanium compound monolith, comprising:
placing a macroporous titanium compound monolith and a metal nitride in a container, the macroporous titanium compound monolith having a co-continuous structure of a macropore and a framework that is composed of titanium dioxide or oxygen-deficient titanium oxide;
creating a vacuum atmosphere or an inert gas atmosphere within the container; and
heating the monolith and the metal nitride to cause gas-phase reduction that removes oxygen atom from, and donates nitrogen atom to, the titanium compound composing the monolith by the metal nitride acting as an oxygen getter and as a nitrogen donor, thereby obtaining a macroporous titanium oxynitride monolith having a co-continuous structure of the macropore and a framework that is composed of titanium oxynitride, the macroporous titanium oxynitride monolith having electron conductivity derived from the titanium oxynitride.

13. The method for producing a macroporous titanium compound monolith according to claim 12, wherein the metal nitride in the form of a powder is placed in the container.

14. The method for producing a macroporous titanium compound monolith according to claim 12, wherein the metal nitride is at least one selected from titanium nitride, zirconium nitride, and hafnium nitride.

15. The method for producing a macroporous titanium compound monolith according to claim 14, wherein the heating is performed at a temperature of 950 to 1200° C.

16. The method for producing a macroporous titanium compound monolith according to claim 12, wherein the metal nitride, and a macroporous titanium dioxide monolith having a co-continuous structure of the macropore and a framework that is composed of titanium dioxide, are placed in the container.

17. A method for producing a macroporous titanium compound monolith, comprising
subjecting a macroporous titanium compound monolith having a co-continuous structure of a macropore and a framework that is composed of titanium dioxide, oxygen-deficient titanium oxide, or titanium oxynitride to a heat treatment in an ammonia-containing atmosphere at a temperature equal to or higher than a thermal decomposition temperature of ammonia, so as to cause gas-phase reduction that removes oxygen atom from, and donates nitrogen atom to, the titanium compound composing the monolith, thereby obtaining a macroporous titanium nitride monolith having a co-continuous structure of the macropore and a framework that is composed of titanium nitride, the macroporous titanium nitride monolith having electron conductivity derived from the titanium nitride.

18. The method for producing a macroporous titanium compound monolith according to claim 17, wherein the heat treatment is performed at a temperature of 1000° C. or higher.

19. The method for producing a macroporous titanium compound monolith according to claim 17, wherein a macroporous titanium dioxide monolith having a co-continuous structure of the macropore and a framework that is composed of titanium dioxide is subjected to the heat treatment in the ammonia-containing atmosphere at the temperature equal to or higher than the thermal decomposition temperature of ammonia.

* * * * *